United States Patent

[11] 3,568,734

[72] Inventors Leslie Vadas
 Los Gatos;
 Robert W. Drake, San Jose, Calif.
[21] Appl. No. 712,203
[22] Filed Mar. 11, 1968
 Division of Ser. No. 461,768, June 7, 1965, Pat. No. 3,456,419.
[45] Patented Mar. 9, 1971
[73] Assignee FMC Corporation
 San Jose, Calif.

[54] CARTON-FILLING APPARATUS
 7 Claims, 38 Drawing Figs.
[52] U.S. Cl............................................. 141/89,
 141/140, 141/147, 141/152
[51] Int. Cl............................................. B65b 3/12
[50] Field of Search......................... 141/89, 91,
 140, 144—147, 152, 177, 188, 266; 198/203, 209;
 53/(Consulted)

[56] References Cited
 UNITED STATES PATENTS
1,512,764 10/1924 Holmquist, Sr............... 141/152X 1,778,216 10/1930 Hansen........................ 141/145X
2,374,268 4/1945 Bingham..................... 141/152X
3,105,525 10/1963 Boucher...................... 141/91X
 FOREIGN PATENTS
 110,198 4/1940 Australia..................... 141/147

Primary Examiner—Laverne D. Geiger
Assistant Examiner—Edward J. Earls
Attorneys—Francis W. Anderson and C. E. Tripp ABSTRACT: Carton-filling apparatus which is adjustable to handle cartons of different sizes and includes a plurality of reciprocable filling heads each having a filling tube and foot valve movable into and out of a carton. An in-motion adjustment device is provided to change the amount of movement of the filling tube while the apparatus is in operations to compensate for overfilling and underfilling of the cartons. A clean-in-place device enables the apparatus to be cleaned without disassembly, and a no-carton, no-fill device is provided to deactivate the filling heads when a carton is not present to receive the product therefrom.

FIG_2

INVENTORS
LESLIE VADAS
ROBERT W. DRAKE

BY F.W. Anderson
C.E. Tripp ATTORNEYS

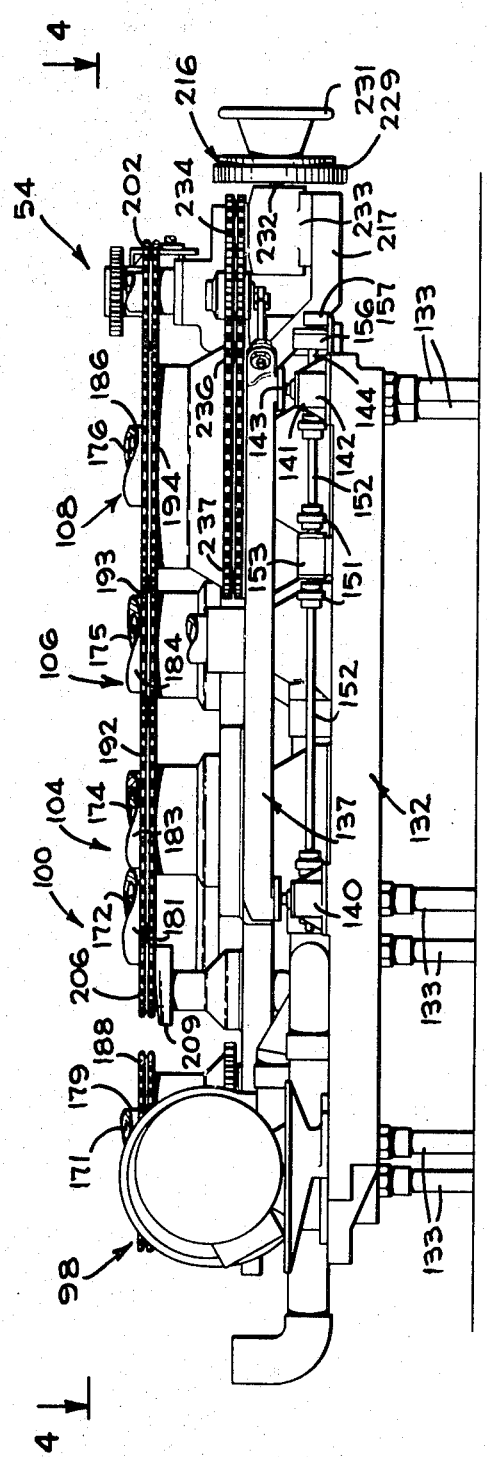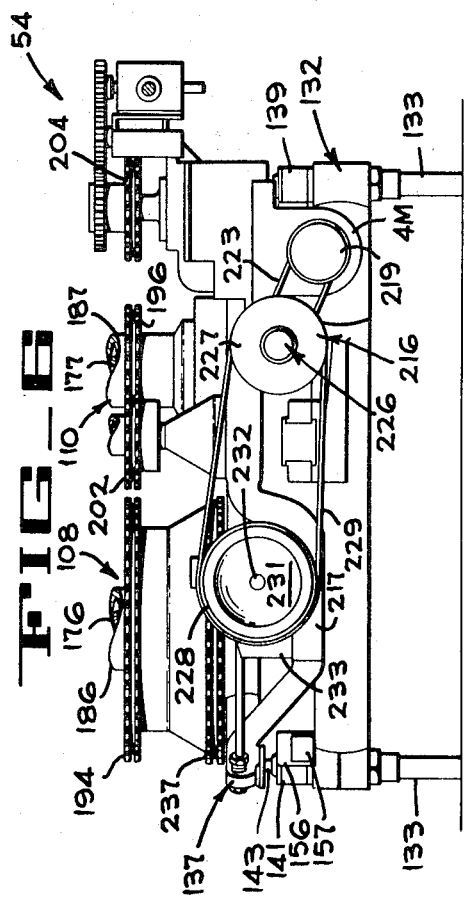

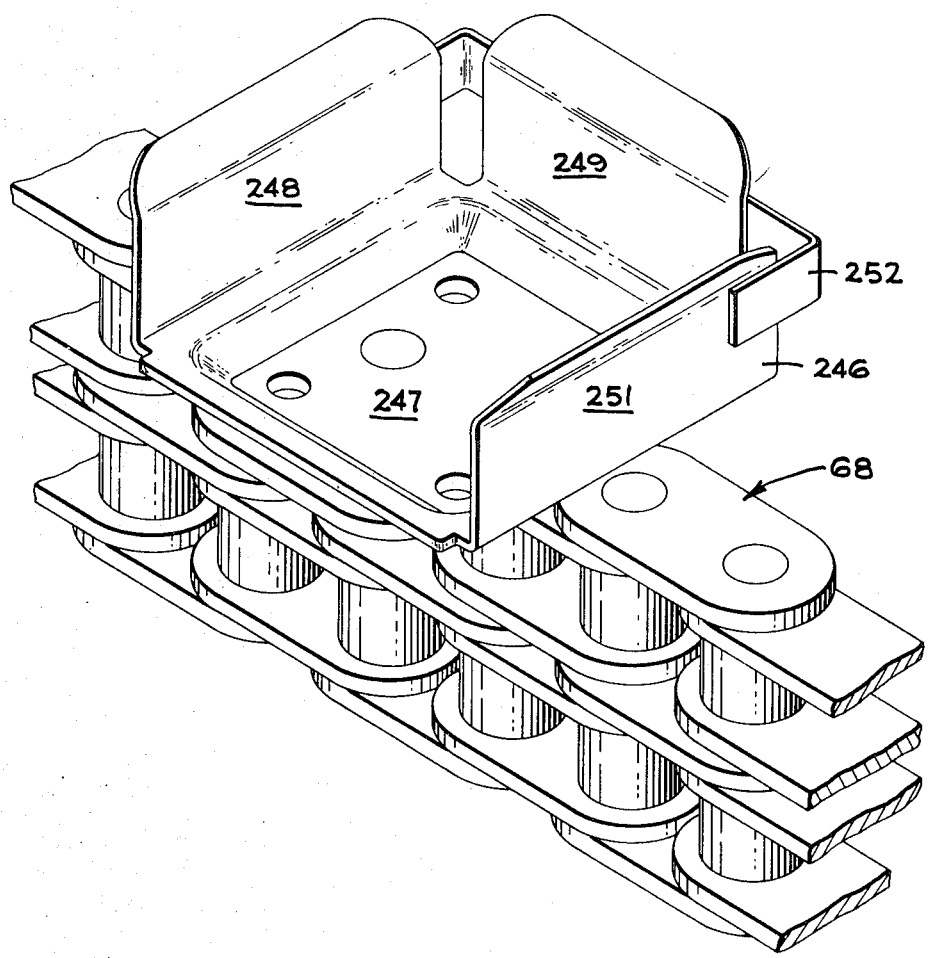

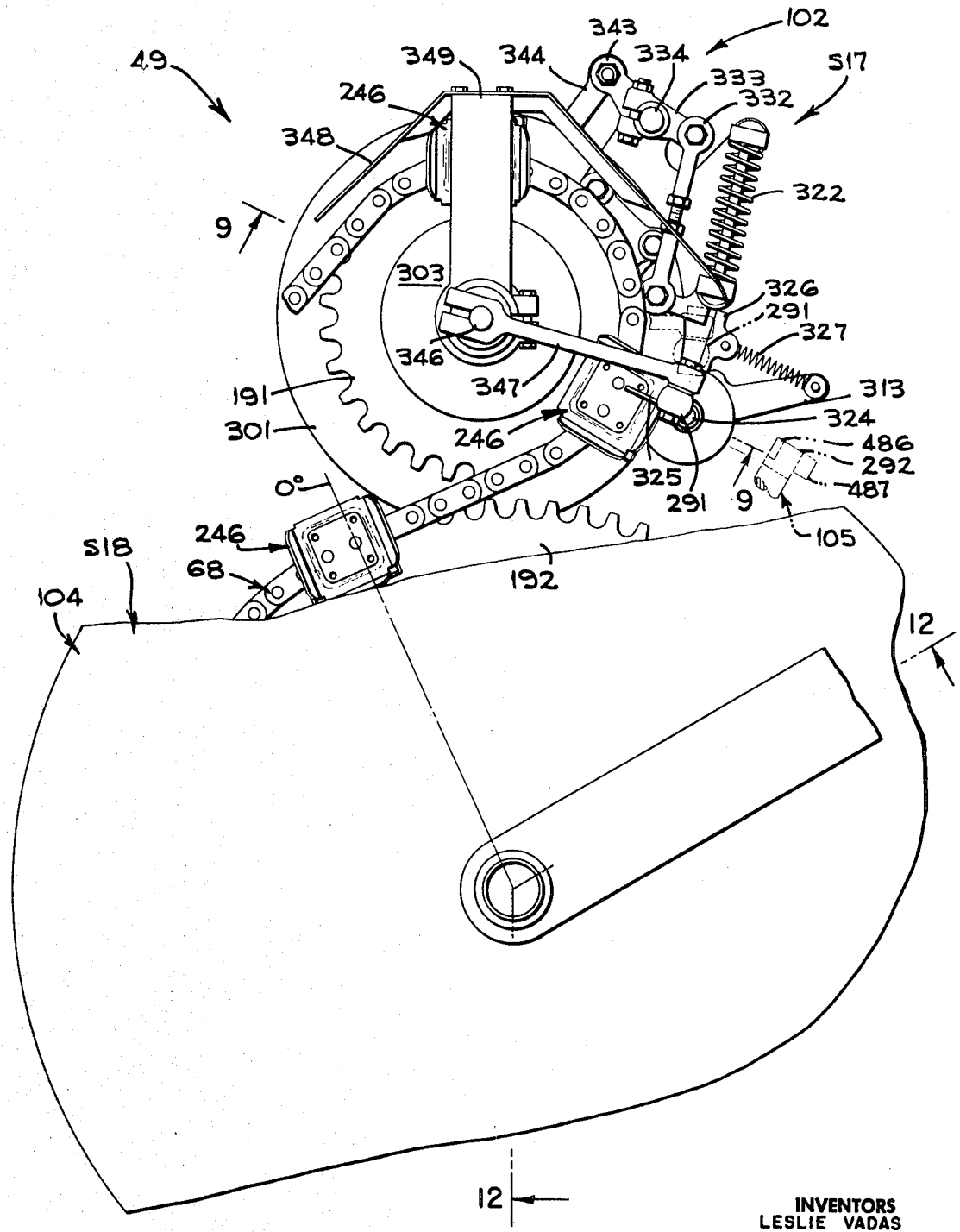

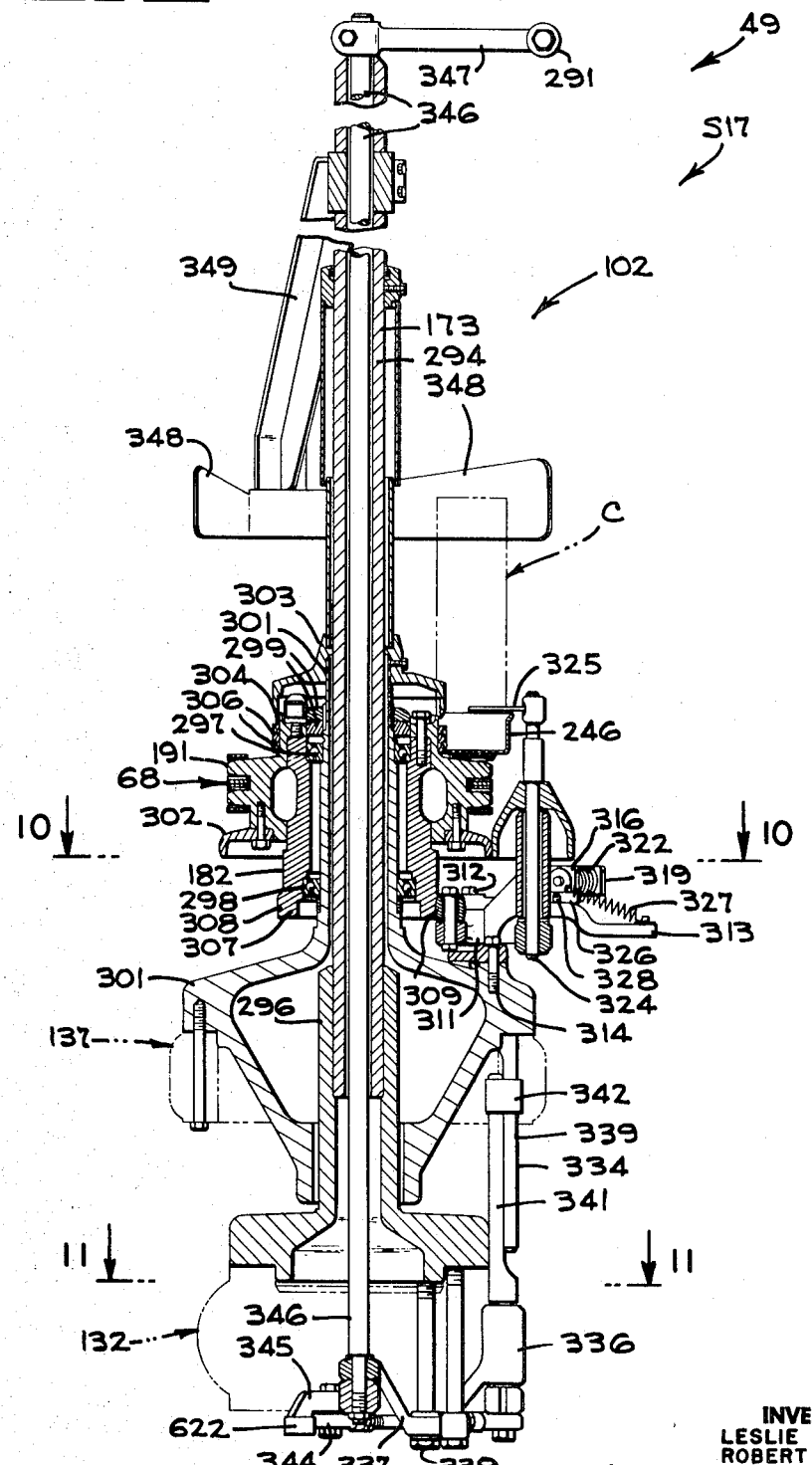

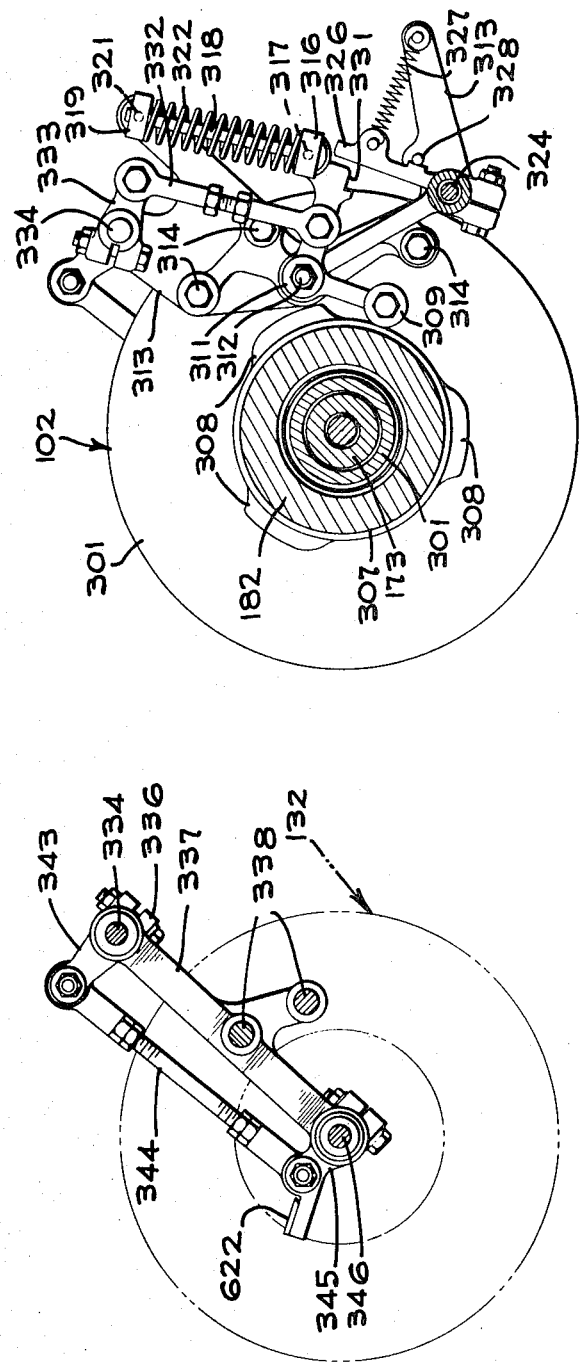

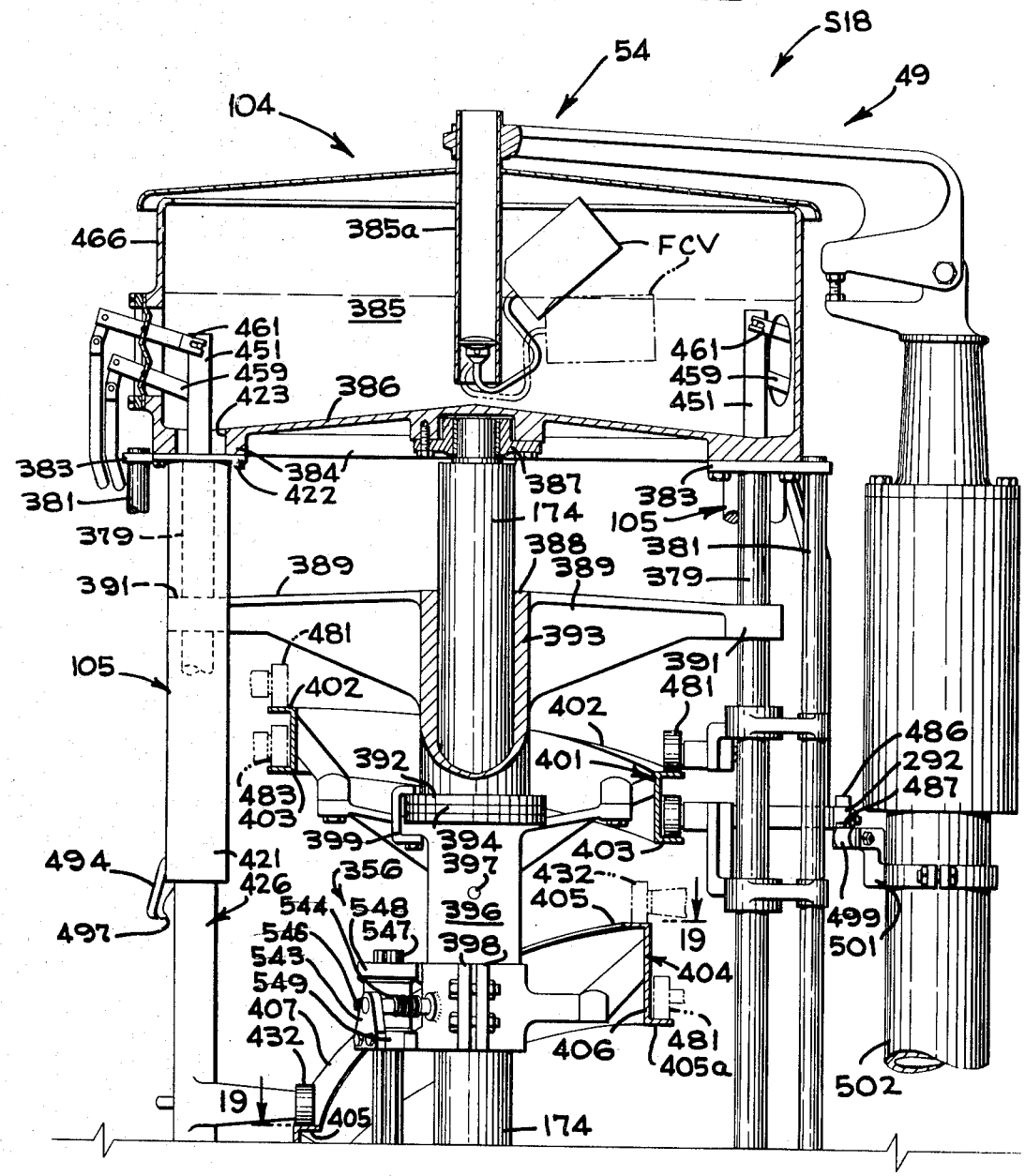

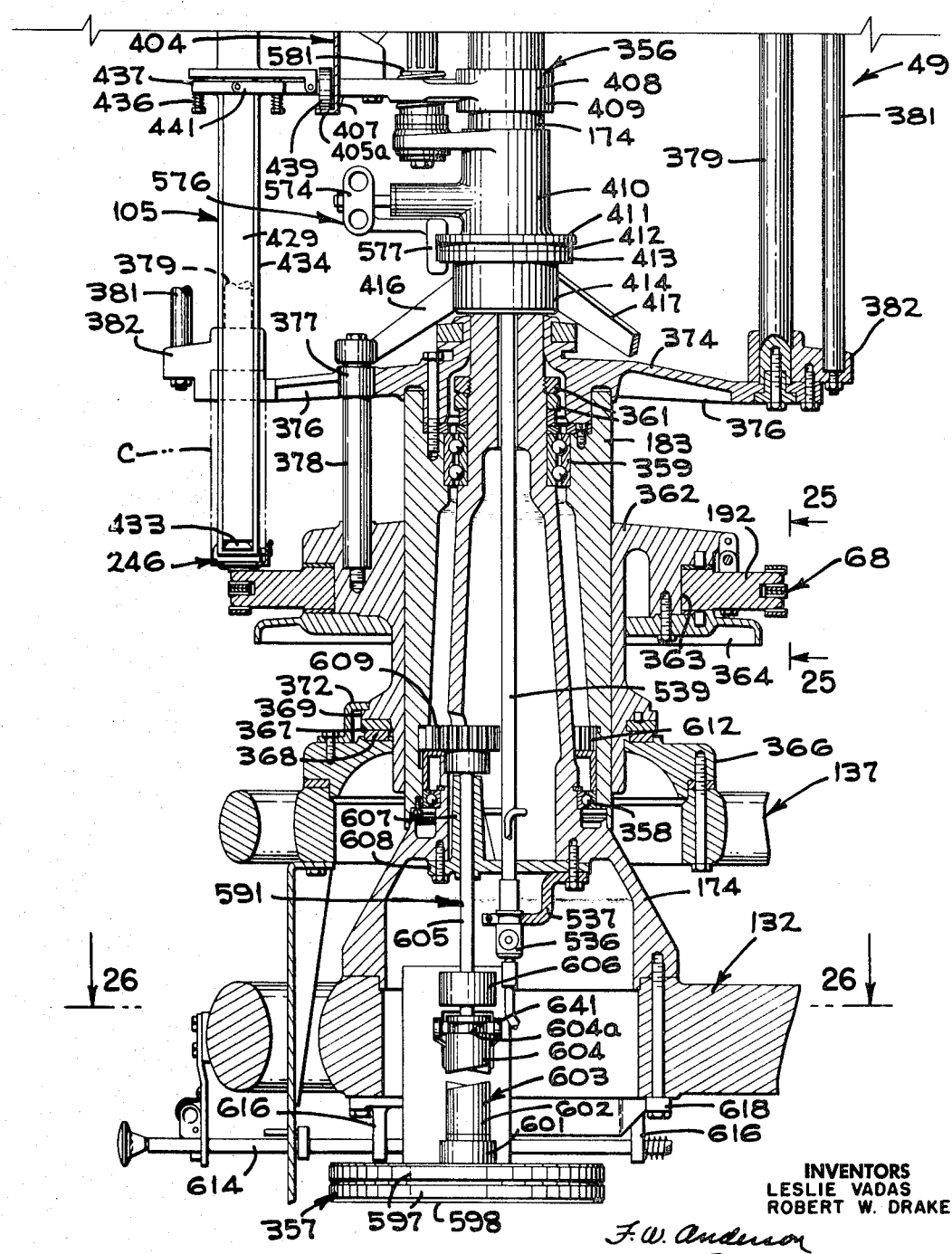
FIG_12B

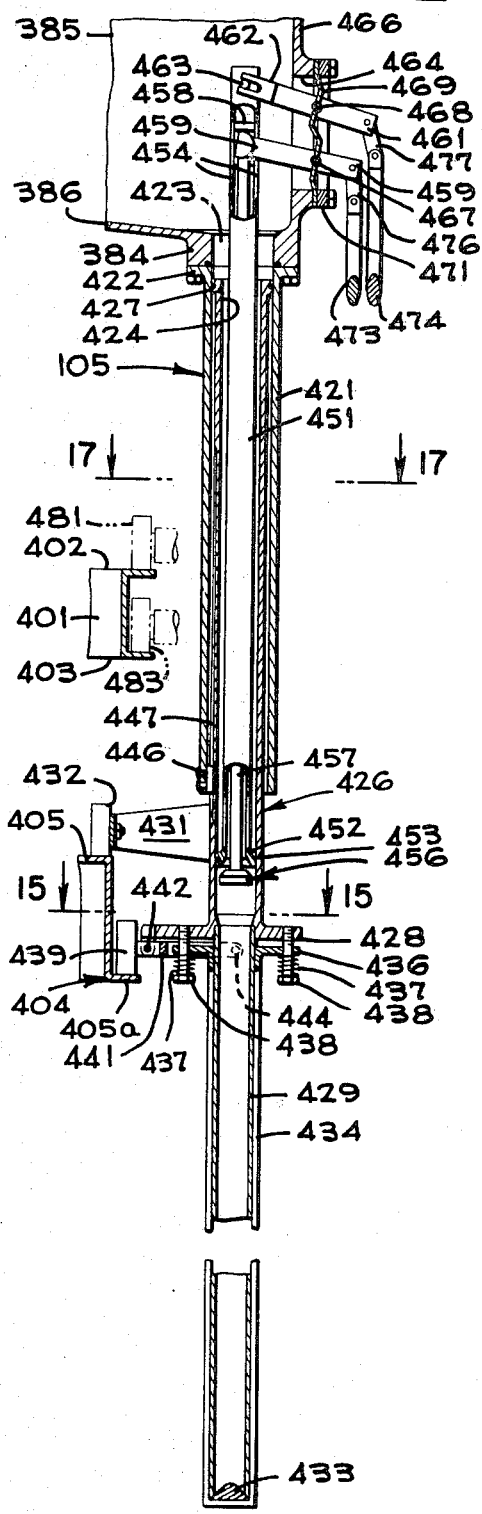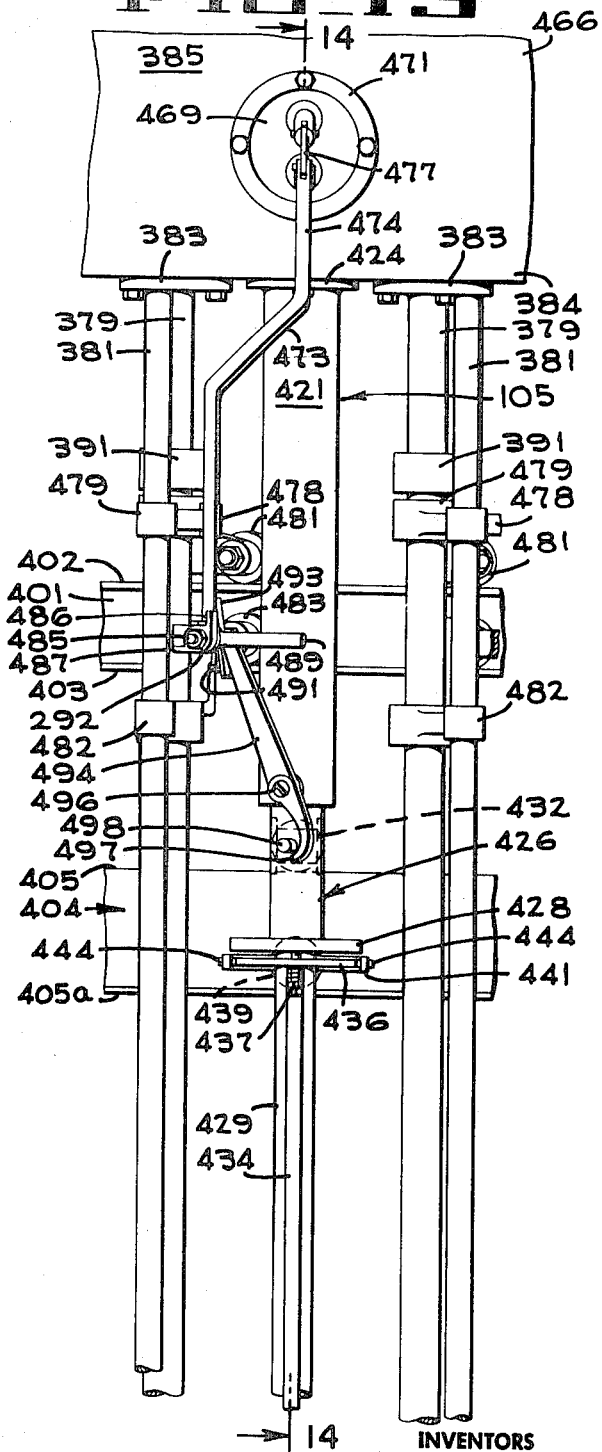

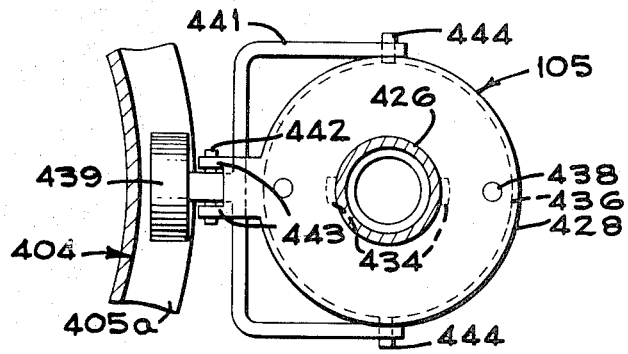
FIG_15
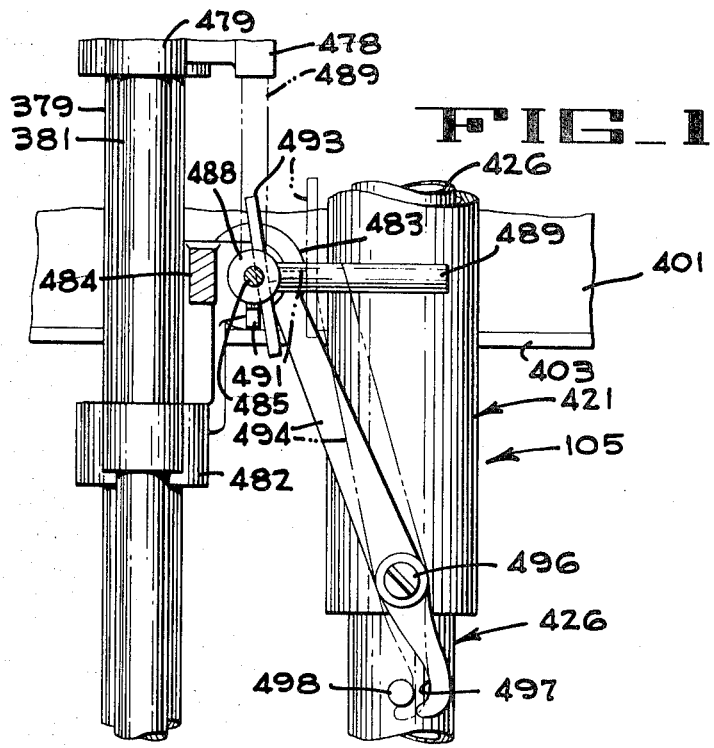
FIG_16

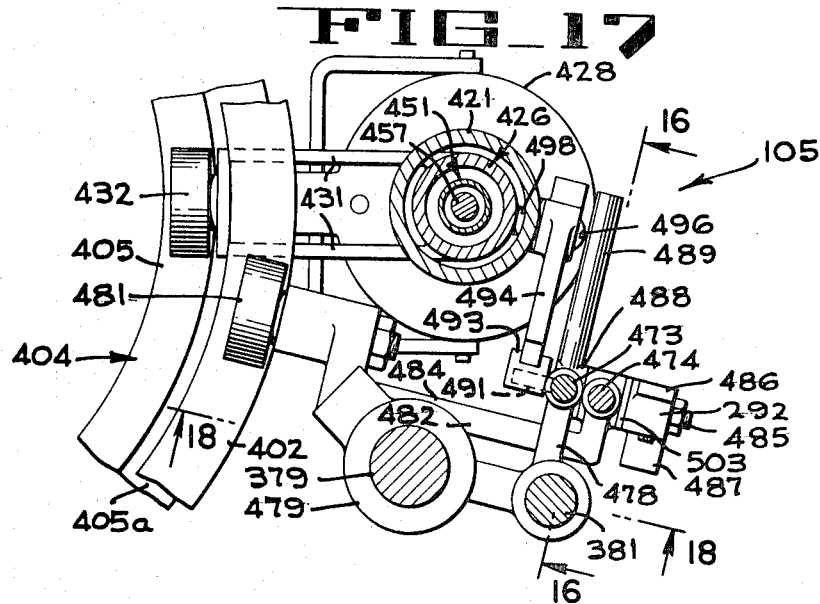
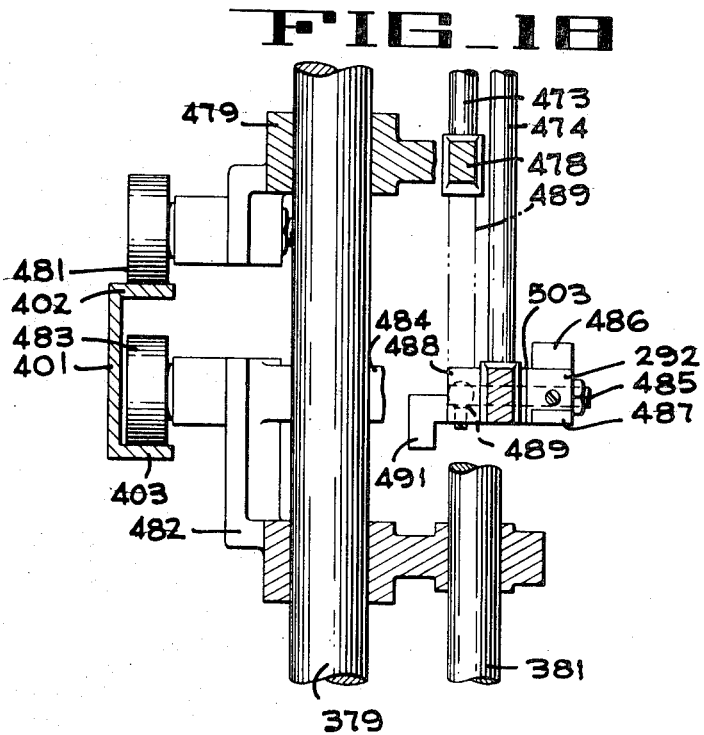

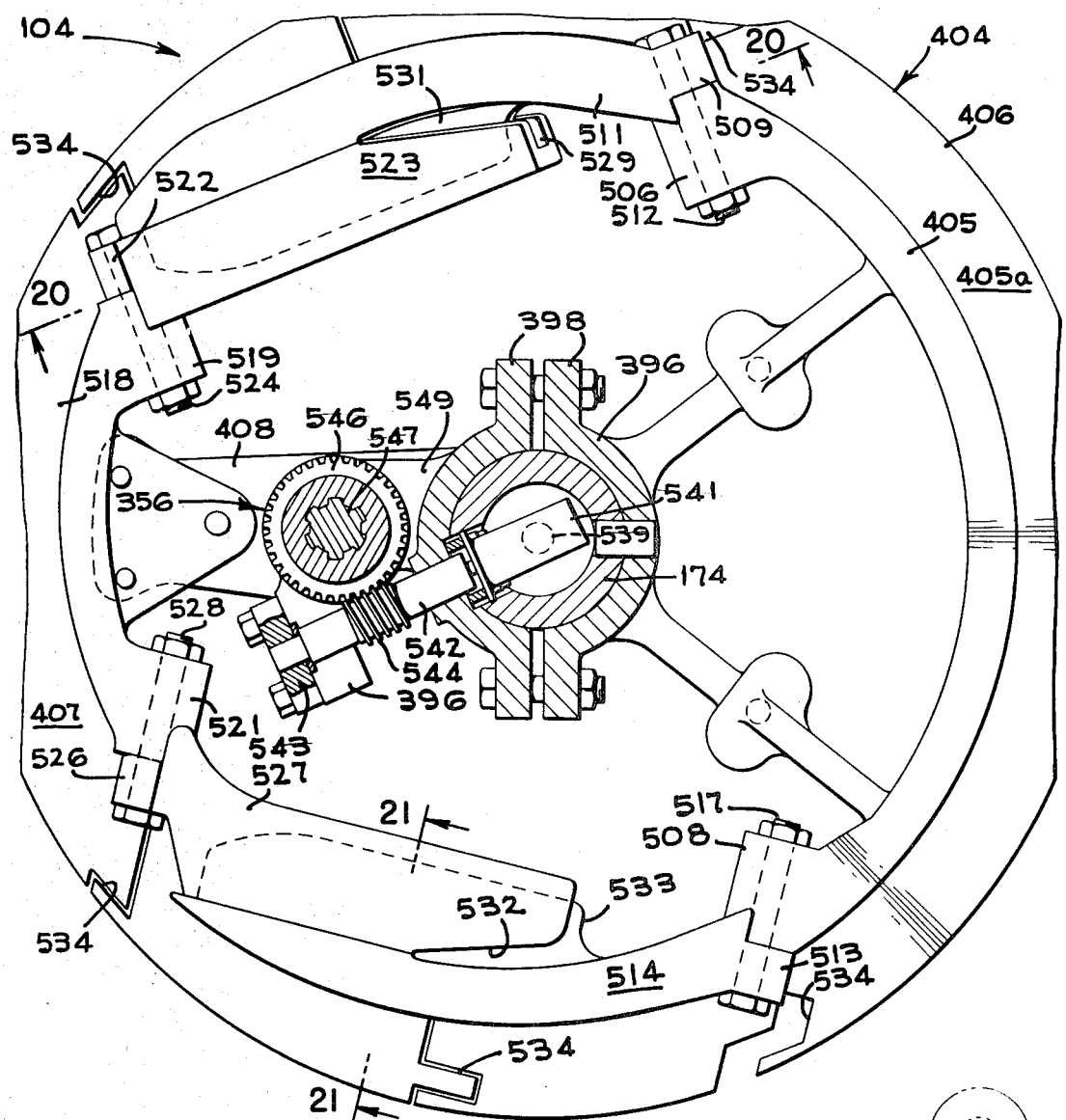
FIG_19
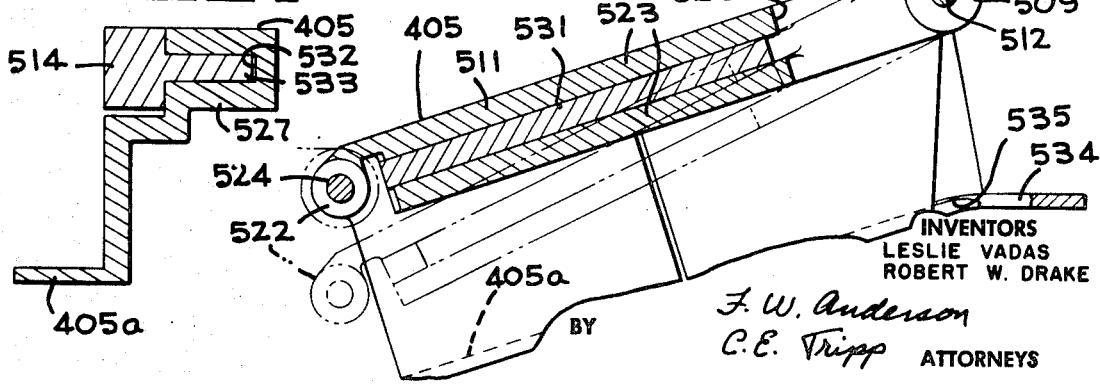
FIG_21
FIG_20
INVENTORS
LESLIE VADAS
ROBERT W. DRAKE
BY F. W. Anderson
C. E. Tripp ATTORNEYS

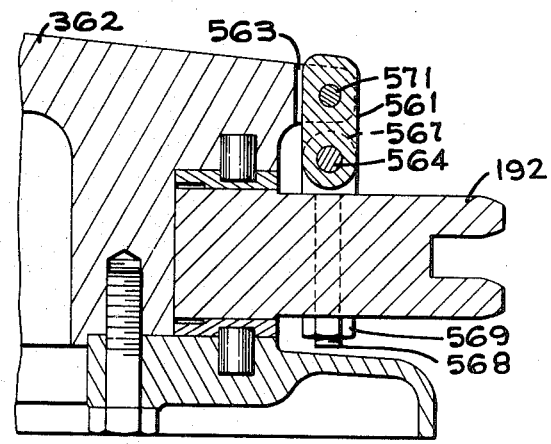
FIG_24
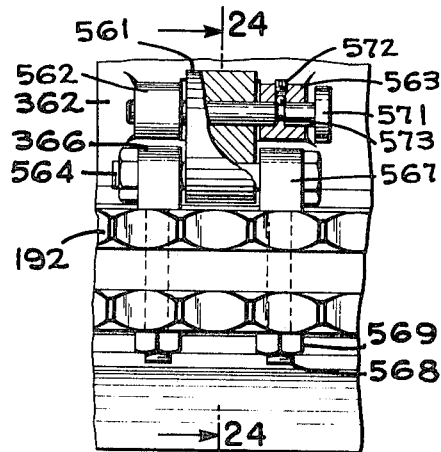
FIG_25
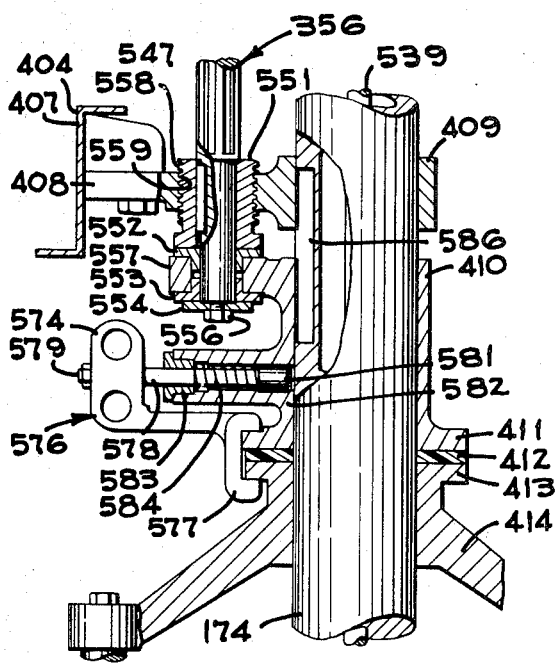
FIG_22
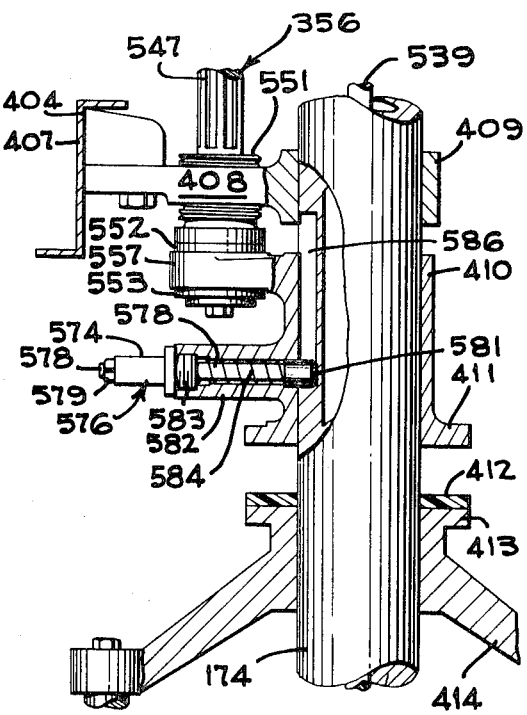
FIG_23

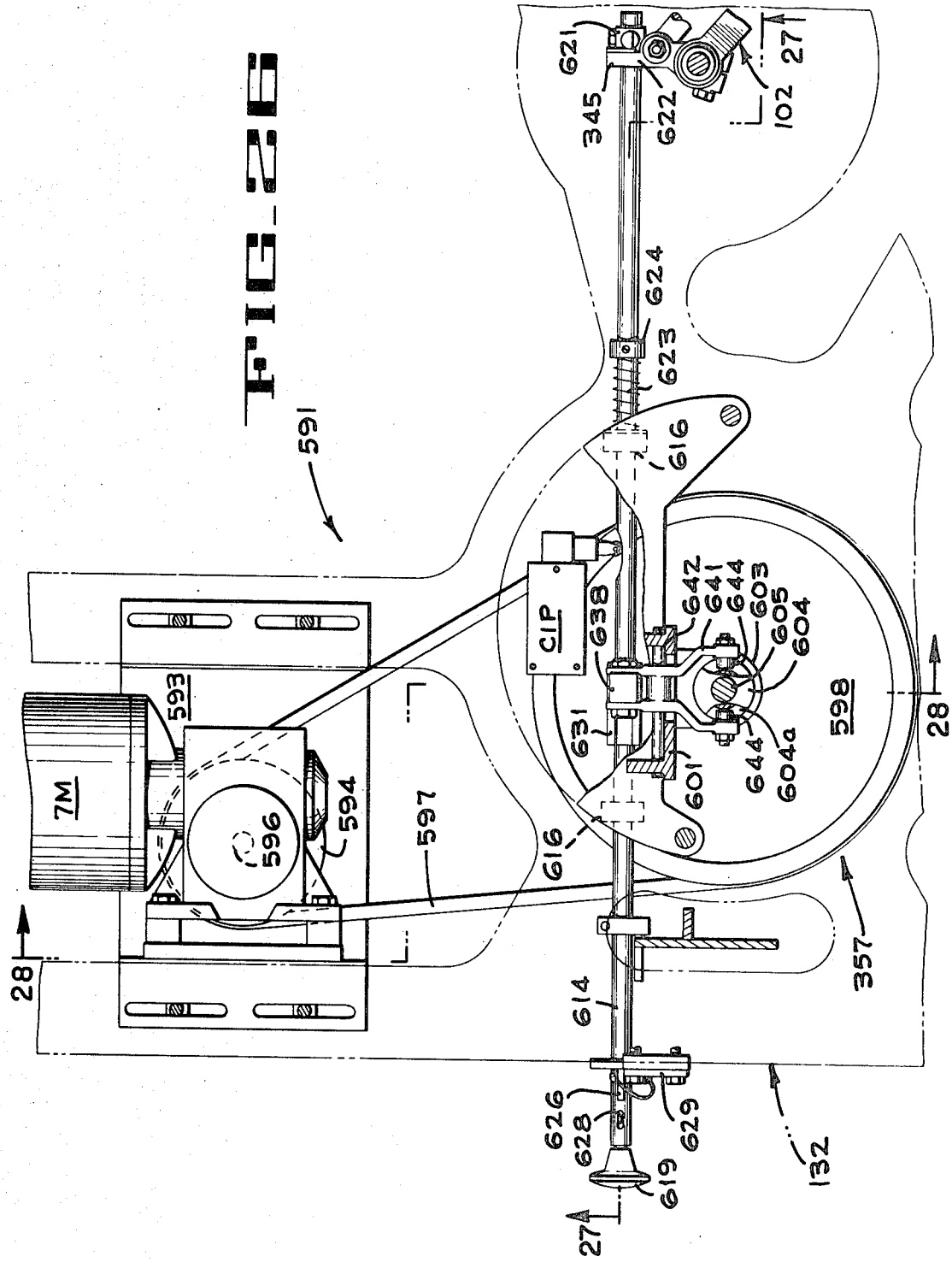

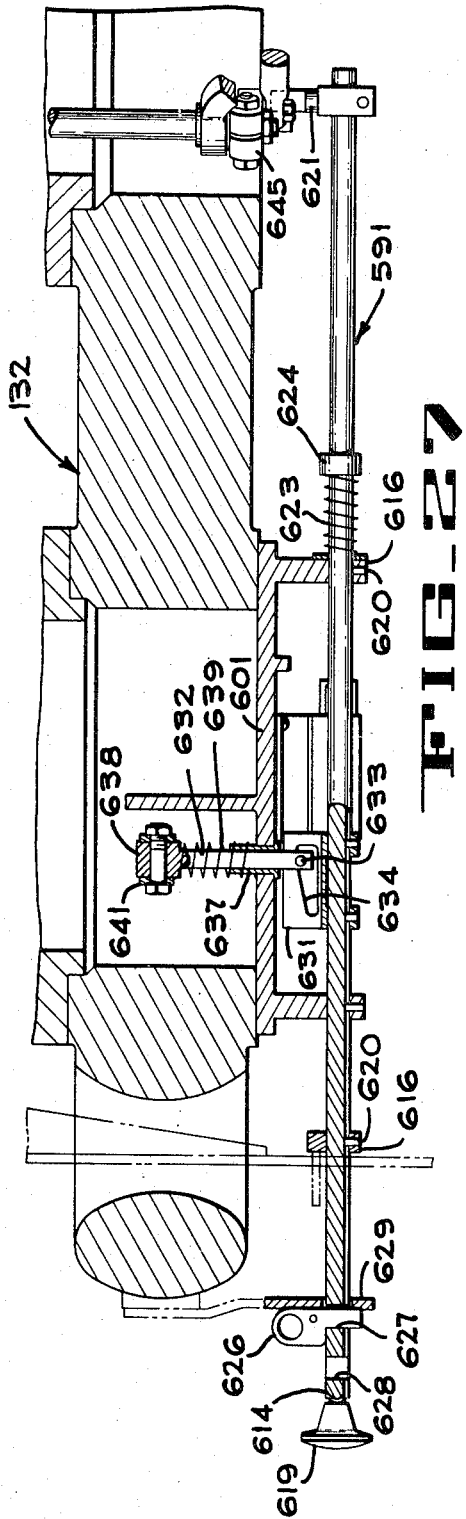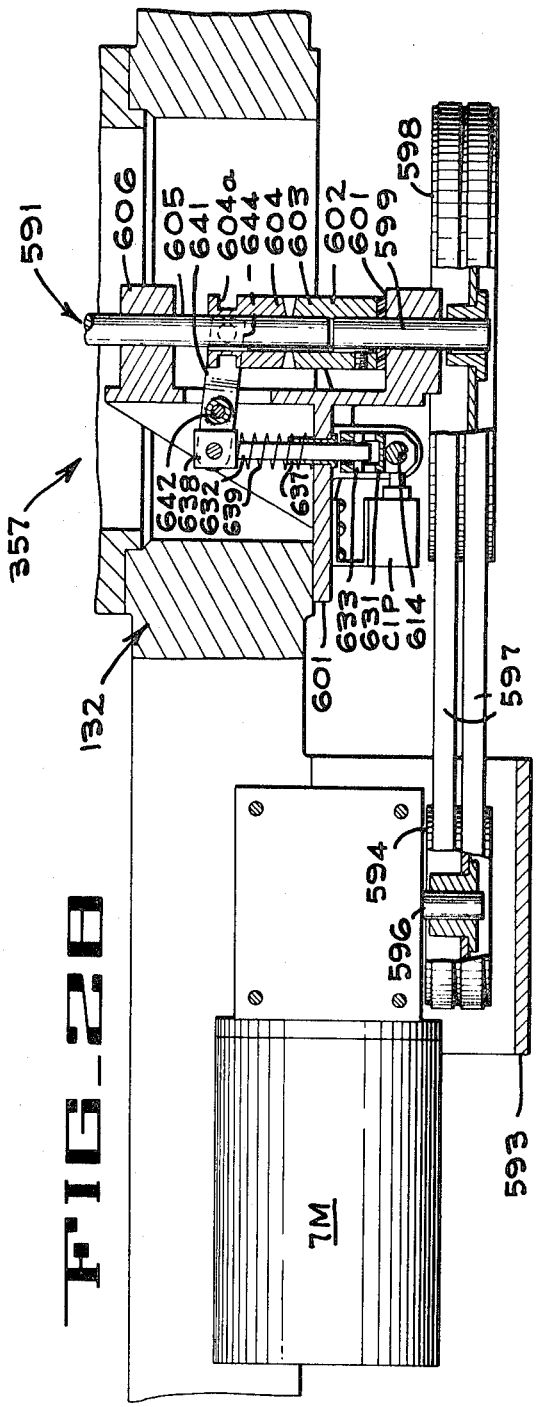

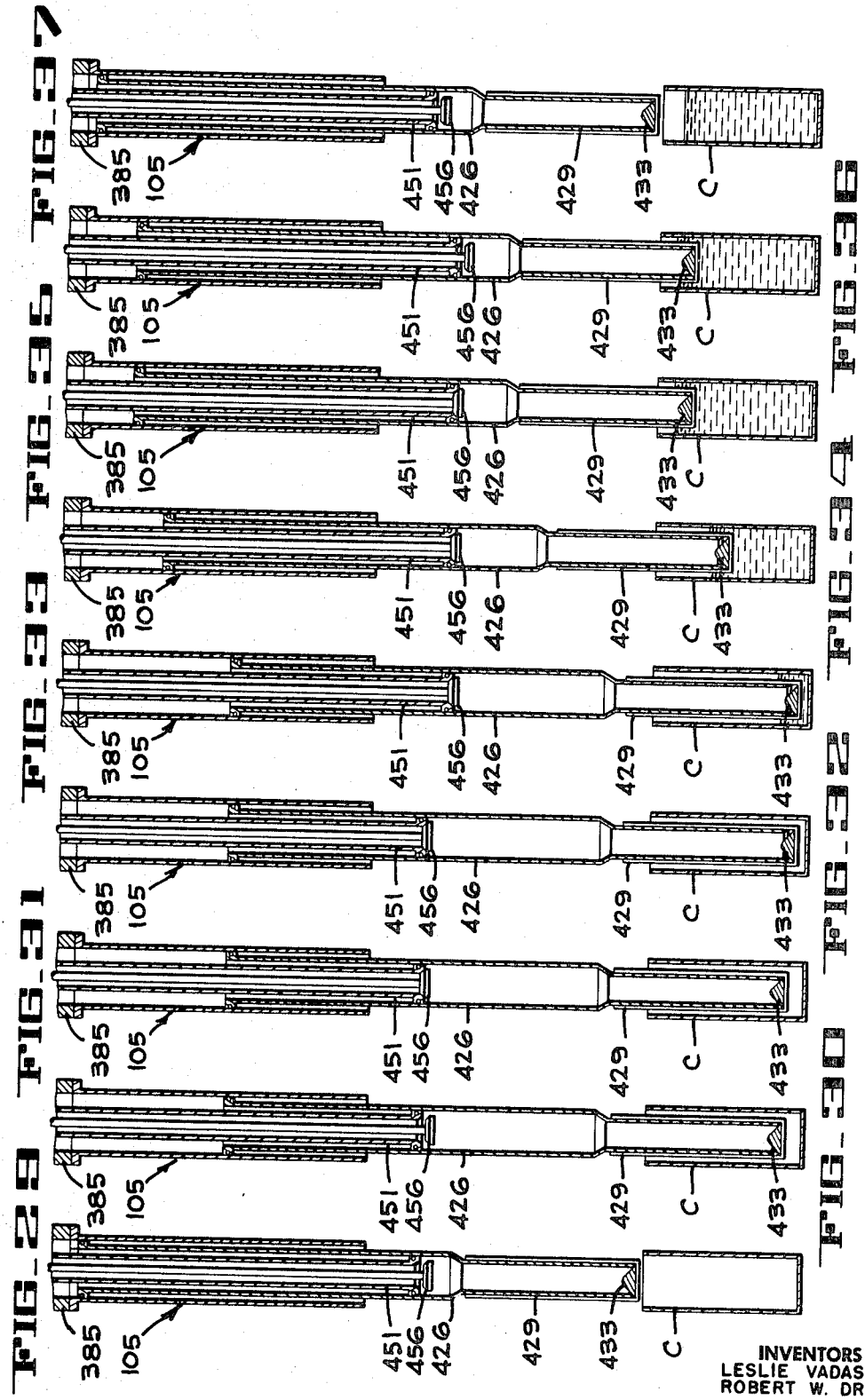

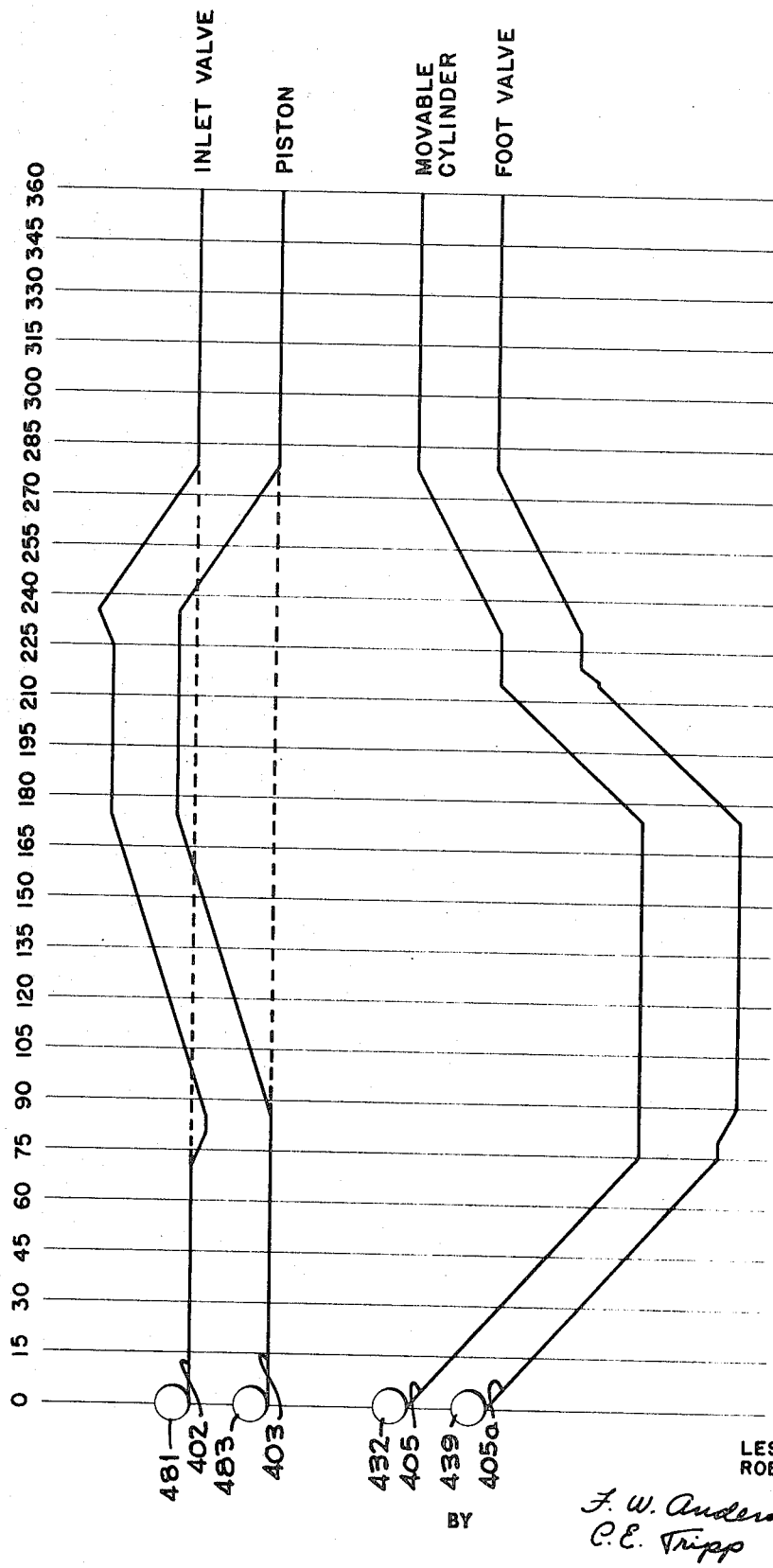

CARTON-FILLING APPARATUS

CROSS REFERENCE TO RELATED APPLICATIONS

This application is a division of application Ser. No. 461,738, filed Jun. 7,1965, which issued as U.S. Pat. No. 3,456,419 on Jul. 22, 1969.

BACKGROUND OF THE INVENTION

This invention pertains to packaging machines and more particularly relates to an apparatus for filling containers with a flowable material such as milk.

Dairy products are frequently packaged in cartons of quart, pint, half-pint and one-third quart sizes to provide for the varied requirements of the customers. Heretofore, dairies were required to have a separate machine for filling each size of carton, thus making the cost of packaging equipment excessive. This excessive equipment expense was especially burdensome on the small dairies. In addition to the nonflexible nature of the machine, the filling apparatus of many of the machines were difficult to clean and were inaccurate as to quantities being filled. Because of the volumetric inaccuracies, the dairies would usually overfill the cartons thereby assuring that the carton weights would comply with minimum weight requirements. The difficulty of cleaning the fillers results in high operating costs, and the inability to accurately control the volume of liquid dispensed reduced the milk sales profits since excessive amounts of the milk was given to the customer free of charge in the amount of overfill.

DESCRIPTION OF THE PRIOR ART

A carton-filling head similar to the filling head disclosed herein, is disclosed in U.S. Pat. No. 3,295,722 which issued to James H. Gordon on Jan. 3, 1967. However, the Gordon filling head as disclosed is adapted to handle only one size of cartons.

SUMMARY OF THE INVENTION

The carton-filling apparatus of the present invention is easily adjusted to handle several sizes of cartons, and in addition to this primary adjustment feature, the filling apparatus also includes an in-motion adjustment device which may be finely adjusted to compensate for overfilling or underfilling the carton thereby assuring that the cartons are accurately filled with the desired quantity of liquid. The filling apparatus also includes a clean-in-place device whereby the filling heads are cleaned without requiring disassembly. A no-carton, no-fill device is also provided to render the filling heads inactive if a carton is not present to receive the liquid therefrom.

BRIEF DESCRIPTION OF THE DRAWINGS

FIG. 4 is a horizontal section of the filling section taken along lines 4-4 of FIG. 5 illustrating the turret placement and drive arrangement, certain parts being cut away.

FIG. 5 is a side elevation of the lower portion of the filling section illustrated in FIG. 4, certain parts being removed.

FIG. 6 is an end elevation of the lower portion of the filling section illustrated in FIG. 4, certain parts being cut away.

FIG. 7 is an enlarged perspective of a portion of the carton transport conveyor of the filling section illustrating one of the carton carriers.

FIG. 8 is a plan of the no-carton, no-fill turret indicating the relationship between the no-carton, no-fill turret and the filling turret.

FIG. 9 is a vertical section taken substantially along lines 9-9 of FIG. 8.

FIG. 10 is a horizontal section taken along lines 10-10 of FIG. 9.

FIG. 11 is a horizontal section taken along lines 11-11 of FIG. 9.

FIGS. 12A and 12B are vertical sections taken along lines 12-12 of FIG. 8 and when combined illustrate the filling turret, certain parts being removed.

FIG. 13 is an elevation of a portion of the filling turret illustrating one of the filling heads.

FIG. 14 is a vertical section with parts broken away taken along lines 14-14 of FIG. 13.

FIG. 15 is an enlarged horizontal section taken along lines 15-15 of FIG. 14.

FIG. 16 is an enlarged vertical section of a portion of the filling head illustrated in FIG. 13 taken along the lines 16-16 of FIG. 17 and showing a cylinder-locking device that is controlled by the no-carton, no-fill device in two operative positions.

FIG. 17 is a horizontal section taken along lines 17-17 of FIG.14.

FIG. 18 is a vertical section taken substantially along lines 18-18 of FIG. 17, certain parts being cut away.

FIG. 19 is an enlarged horizontal section taken substantially along the lines 19-19 of FIG. 12A and illustrating an adjustable cam and parts of an in-motion adjustment mechanism.

FIG. 20 is a vertical section of the adjustable cam taken along lines 20-20 of FIG. 19.

FIG. 21 is a section taken along lines 21-21 of FIG. 19 illustrating a tongue and groove connection.

FIG. 22 is an enlarged vertical section illustrating a portion of the in-motion adjustment mechanism and a portion of the clean-in-place mechanism.

FIG. 23 is a view similar to FIG. 22 but illustrating the clean-in-place mechanism in a different operative position.

FIG. 24 is an enlarged vertical section taken along lines 24-24 of FIG. 25 illustrating a conveyor unlatching device.

FIG. 25 is an elevation of the conveyor unlatching device taken looking in the direction of arrows 25-25 of FIG. 12B.

FIG. 26 is an enlarged horizontal section taken substantially along lines 26-26 of FIG. 12B illustrating a portion of the clean-in-place mechanism.

FIG. 27 is a vertical section taken along lines 27-27 of FIG. 26.

FIG. 28 is a vertical section taken along lines 28-28 of FIG. 26.

FIG. 29 to 37 are operational views of the filling heads illustrating progressive steps in one cycle of operation of the filling heads.

FIG. 38 is a diagram of the cams which control the operation of the filling head.

DESCRIPTION OF THE PREFERRED EMBODIMENT

Although the cartons handled by this machine are not a part of the present invention, it is to be understood that the cartons are made of a thermoplastic laminate, including a laminated cardboard inner base layer with a polyethylene coating on both the outside and the inside of the base layer. The transverse cross section of the bottom closures BC (FIG. 3) and of the top closures TC of each of the referred to carton sizes, i.e., the quart C, one-third quart C1, pint c2 C2 and half-pint C3 sizes are identical and only the height of the carton varies. It is to be understood that the machine may be easily modified to handle cartons of other capacities.

GENERAL DESCRIPTION

Figure 1:
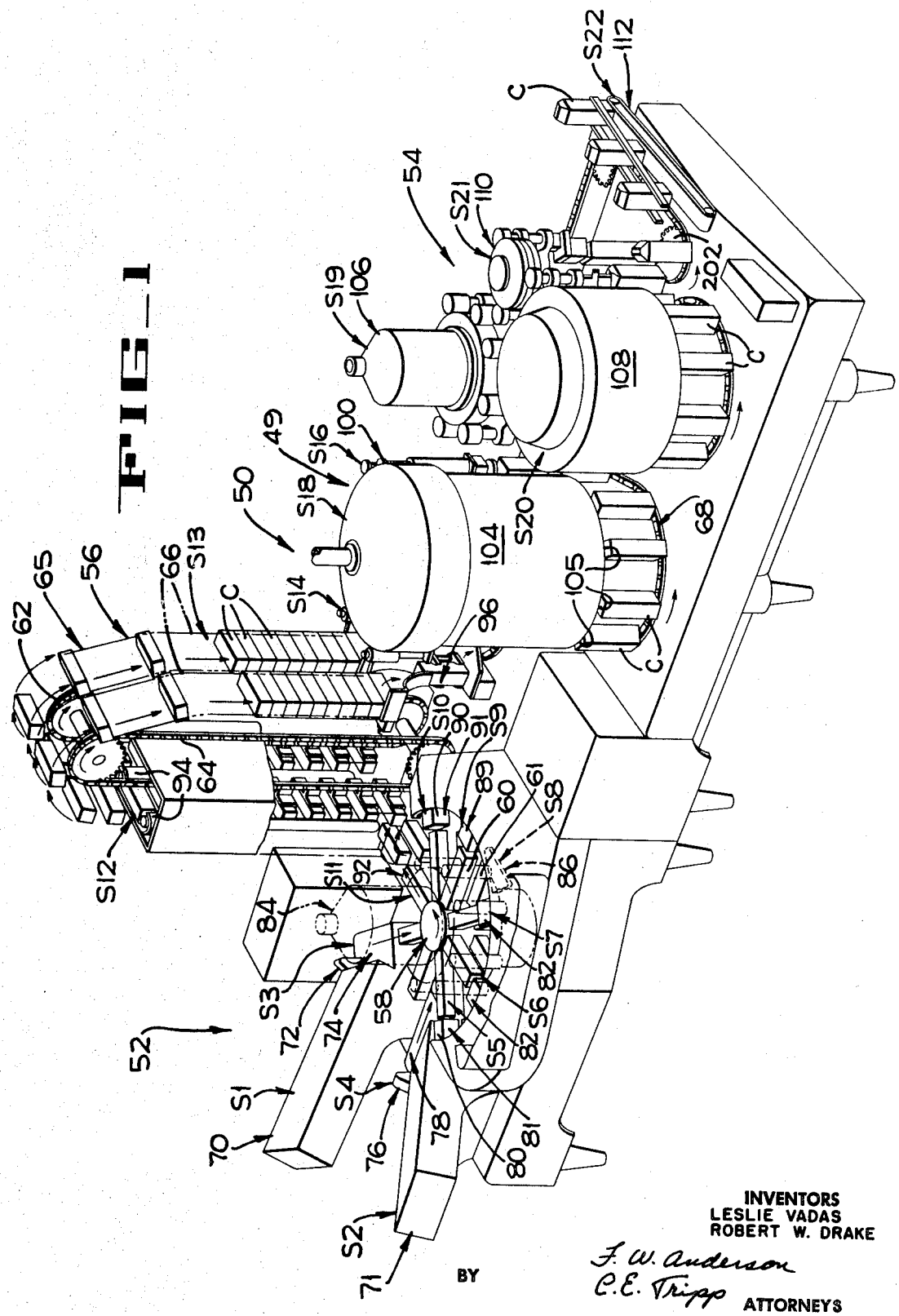
FIG. 1 is a diagrammatic perspective, with certain parts being cut away, illustrating a carton-forming and filling machine having the carton-filling apparatus of the present invention associated therewith.
Figure 2:
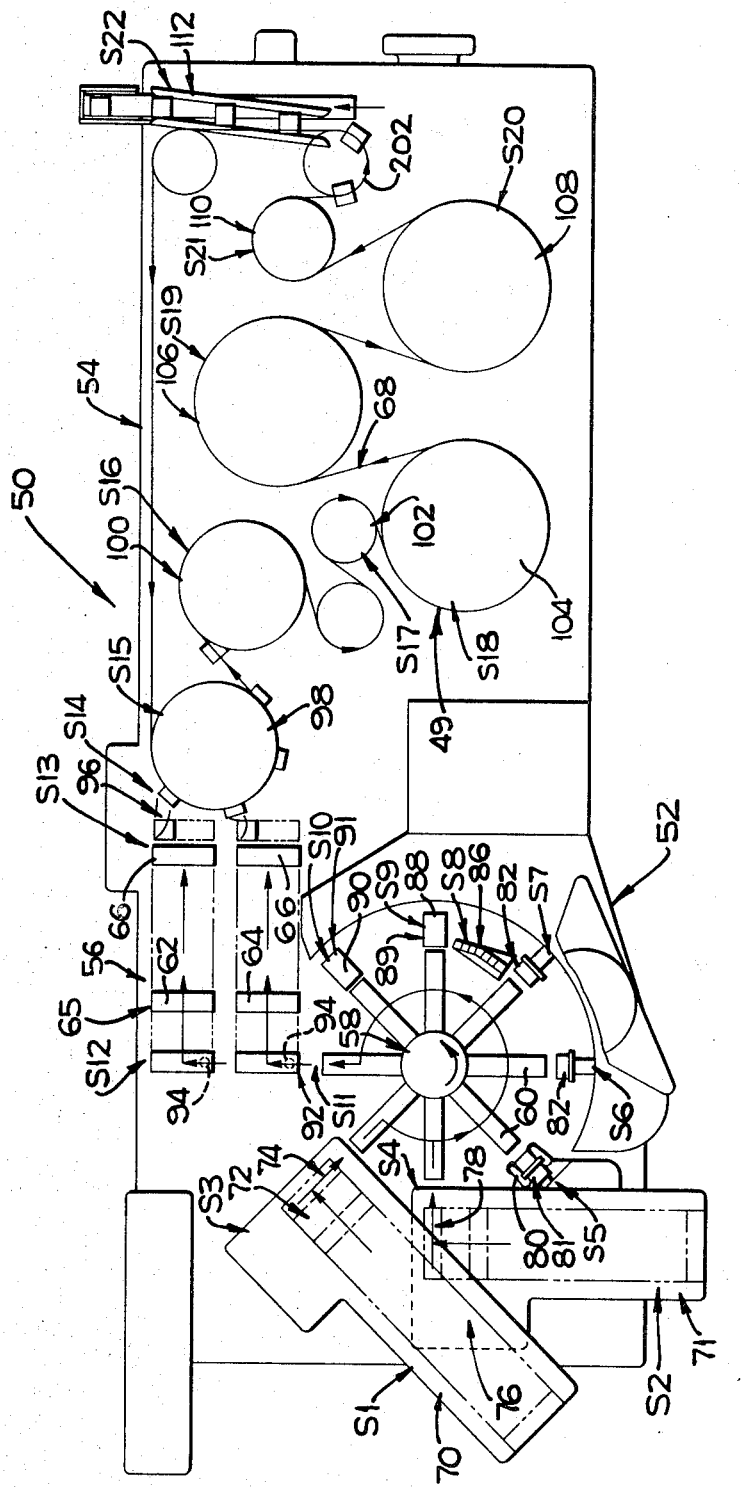
FIG. 2 is a diagrammatic plan of the machine of FIG. 1 illustrating the relative positions of the several components of the machine.

The carton-filling apparatus 49 (FIGS. 1 and 2) of the present invention forms a part of a carton-forming and filling machine 50 that is arranged to receive folded carton blanks, open the blanks to a tubular configuration, seal the bottom closures BC of the blanks B to form cartons C, sterilize the cartons, fill the cartons, seal the top closures TC of the cartons, and thereafter stamp suitable identifying indicia on the cartons before discharging the filled and sealed cartons from the machine. Because of the many operations performed on the cartons as they pass through the machine, the different sections of the machine in which successive operations on the cartons are performed will be identified as consecutively numbered processing stations S1 through S22.

The carton-forming and filling machine (FIGS. 1 and 2) broadly includes a forming or dry section 52, and a filling or wet section 54 interconnected to the dry section by a carton sterilizing and accumulating section 56. The carton-filling apparatus 49 of the present invention is disposed in the filling section 54 and performs the carton-filling function. The cartons are advanced through the forming section 52 (Stations S1—S11) in two rows by an intermittently driven carton-forming turret 58 having an upper and a lower series of horizontally disposed, equally spaced, mandrels 60 and 61, respectively. The to two rows of cartons are then transferred into the sterilizing and accumulating section 56 (Station S12 and S13) we where a pair of continuously driven accumulating conveyors 62 and 64 of an accumulator 65 advance the two rows of cartons into accumulating guideways 66 of the accumulating section 56. The two rows of cartons form two columns of cartons in the guideways, permitting the lower carton in each column to be transferred upon demand of the filling section 54 onto a common continuously driven carton transport conveyor 68 of the filling section 54 (Stations S14 to S22) during which time the cartons are filled by the apparatus of the present invention, sealed, marked, and subsequently discharged from the machine 50.

In general, the cartons progress through the following operating components at the 22 processing stations in the following manner. An upper magazine 70 at Station S1 (FIGS. 1 and 2) and a lower magazine 71 at Station S2 each receives a stack of flat folded carton blanks. The folded carton blanks are withdrawn from the upper magazine 70 (FIGS. 1 and 2) by an upper erecting mechanism 72 at the Station S3 which overbends the blanks and places them one at a time in the form of an open end tube of square cross section in position to be engaged by an upper loader 74 which is also located at Station S3 and pushes the squared carton blanks onto the associated upper mandrels 60 with the bottom closures projecting outwardly therefrom. Similarly, carton blanks are withdrawn from the lower magazine 71 by a lower carton erecting mechanism 76 at the Station S4 which places the carton blanks in position to be engaged by a lower loader 78 which pushes the carton blanks one at a time onto the lower mandrels 61 as the lower mandrels are intermittently registered with the loader 78 at Station S4. Thus when erected cartons are disposed on the mandrels 60 and 61 the top end of each carton is disposed inwardly toward the axis of the turret while the bottom of the carton is positioned near the periphery of the turret.

After a pair of open-ended, tubular carton blanks have been placed on an upper mandrel 60 and on a lower mandrel 61, which mandrels lie in common vertical planes, the intermittently driven forming turret 58 indexes the carton to Station S5 where identical bottom forming heads 80 of a bottom former 81 engages the bottom closure flaps of the carton blanks and bend the flaps about score lines formed in the bottom closure. The cartons are then advanced to Station S6 where heating heads 82 of a bottom heater direct hot air at only those portions of the bottom closure flaps which are subsequently sealed together. After being partially heated at Station S6, the cartons are advanced to Station S7 where other bottom heating heads 82 of the bottom heater direct additional hot air at only those flaps of the bottom closures which are subsequently sealed together to complete the bottom heating operation, leaving the thermoplastic material on the bottom flaps thereon in a tacky condition suitable for sealing. The cartons with the heated bottom closures are then moved past roller plows 86 at Station S8 which folds the bottom closure flaps together so that they are in sealing position as they reach the preliminary bottom sealing heads 88 of a preliminary bottom sealer 89 at the preliminary bottom sealing Station S9. After the bottom closures are partially sealed at Station S9, they are advanced to Station S10 where final sealing heads 90 of a final bottom sealer 91 completely seal the bottom closures and crush certain portions of the bottom closure flaps to block any potential undesirable flow passages in the bottom closures. The cartons with their bottom closures sealed are then advanced to Station S11 wherein an unloading mechanism 92 removes the partially closed cartons from the mandrels 60 and 61 of the forming section 52 and moves the cartons into positions to be received by the accumulator conveyors 62 and 64 of the sterilizing and accumulating section 56.

The two rows of cartons are then continuously moved upwardly by the conveyors 62 and 64 past ultraviolet lights 94 at Station S12 thereby sterilizing the cartons. Continued movement of the accumulator conveyors 62 and 64 carries the cartons to Station S13 wherein the cartons are deflected from the conveyors 62 and 64 and gravitate into the carton accumulating guideways 66 where two stacks or columns of cartons with their bottom closures sealed are accumulated for subsequent feeding into the filling section 54 upon demand from the filling section.

At Station S14, two cartons, one from each guideway 66, are transferred onto the continuously driven carton conveyor 68 by a carton feed mechanism 96. The feed mechanism 96 cooperates with certain parts of a crimping turret 98 (FIG. 2) at Station S15 to crimp certain tabs of the top closures of the cartons and positively seat the cartons on the conveyor 68. The cartons are then advanced to Station S16 where a top-forming turret 100 bends certain flaps of the top closures around score lines formed in the top closures. The cartons then move past a no-carton, no-fill turret 102 of the filling apparatus 49 of the present invention at Station S17 and into a filling turret 104 at Station S18 where all cartons are filled by one of eight identical filling heads 105 with the liquid being processed. After being filled by the apparatus of the present invention the cartons are advanced to a top-heating turret 106 at Station S19 where those flaps of each top closure, which are subsequently sealed together, are heated to the bonding temperature by hot air. The cartons are then advanced to a top-sealing turret 108 at Station S20 where the heated top closures are sealed. The filled and sealed cartons are then advanced past the marking Station S21 where a marking turret 110 impresses suitable carton identifying indicia upon the cartons. The cartons are then discharged from the carton former and filler 50 by a continuously driven discharge conveyor 112 at Station S22.

FILLING SECTION CONVEYOR AND CARTON SIZE ADJUSTMENT

As mentioned previously, the filling section 54 (FIG. 1) is operated independently of the forming section 52 and independent of the accumulating section 56. The filling section 54 is provided with its own drive, which is independent of the drive for the forming section 52 and of the accumulating section 56, and if desired, may be operated when the operative components of the drive section and the accumulator conveyors 62 and 64 are not in motion provided a sufficient number of cartons are present in the accumulator guideways 66.

All of the components of the filling section 54 (FIGS. 4, 5, and 6) are carried by a stationary frame 132 having feet 133 which may be adjusted to maintain the stationary frame 132 in a horizontal plane. The stationary frame 132 is attached to the frame of the forming section 52 by adjustable links as fully disclosed in the parent application.

In order to accommodate four sizes of cartons, a vertically adjustable frame 137 is mounted on four screwjacks 138, 139, 140 and 141 of standard well known design. Each screwjack includes a housing 142, which housing is rigidly secured to the stationary frame 132, and a vertically movable shaft 143 which is actuated upon rotation of a horizontal shaft 144 journaled in and extending outwardly from both sides of the housing 142. The upper end of each vertical shaft 143 is connected to the adjustable frame 137, and accordingly, vertical movement of the shafts 143 will cause the adjustable frame 137 to move vertically.

Figure 4:
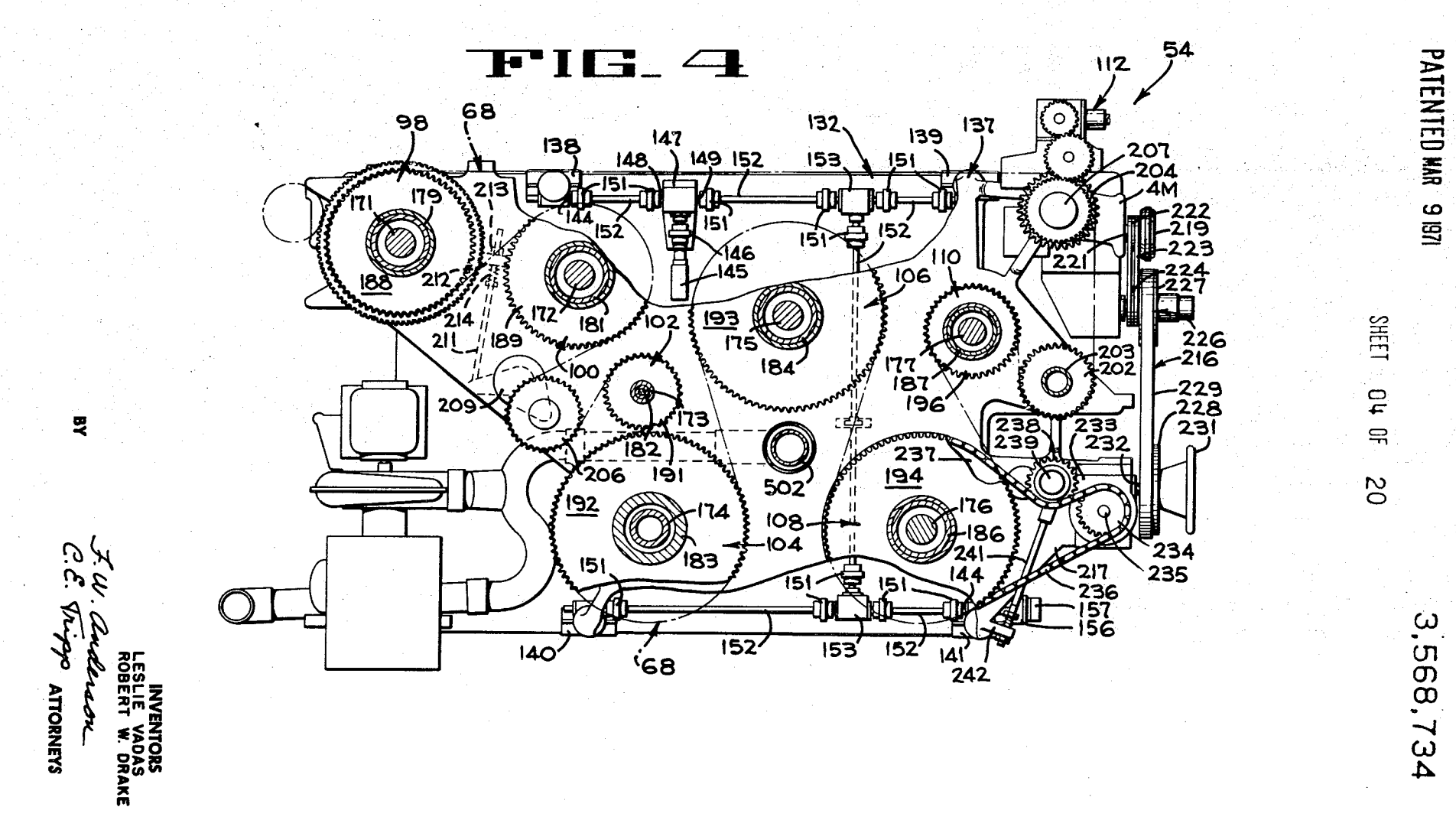

As shown in FIG. 4, an air motor 145 is supported by the stationary frame 132 and is connected by a flexible coupling 146 to the input shaft of a right-angle gearbox 147. The output shafts 148 and 149 of the gearbox 147 are connected by flexible couplings 151, cooperating line shafts 152, and right-angle gearboxes 153 to the horizontal shafts 144 of each screwjack 138, 139, 140 and 141 thereby assuring that the movable frame 137 will be maintained horizontal during actuation of the jacks.

For accurately determining the amount of movement imparted to the adjustable frame 137, the horizontal shaft 144 of the gearbox 141 (FIG. 5) is connected to a gearbox 156 which is, in turn connected to a counter 157 that is calibrated to measure the vertical movement of the adjustable frame 137 in thousandths of an inch.

As will be described in more detail hereinafter, the stationary frame 132 has bolted thereto stationary columns 171, 172, 173, 174, 175, 176 and 177 which define the vertical axes of rotation for the crimping turret 98, the top forming turret 100, the no-carton, no-fill turret 102, the filling turret 104, the top heating turret 106, the top sealing turret 108, and the marking turret 110 respectively. Tubular turret drive columns 179, 181, 182, 183, 184, 186 and 187 are journaled about stationary columns 171, 172, 172, 174, 175, 176, and 177, respectively, and turret drive sprockets 188, 189, 191, 192, 193, 194, and 196 are connected to the tubular turret drive columns 179, 181, 182, 183, 184, 186 and 187, respectively, for rotation therewith but are mounted for vertical sliding movement relative to the associated tubular columns. Additionally, each turret drive sprocket is connected to the adjustable frame 137 for rotation relative thereto and for vertical movement therewith.

The carton transport conveyor 68 (FIGS. 4 and 7) is trained around the sprocket 188, 189, 191, 192, 193, 194 and 196. The transport conveyor is also trained around an idler sprocket 202 that is journaled on a shaft 203 secured to the adjustable frame 137, around a drive sprocket 204 for the discharge conveyor 112, and around a takeup sprocket 206. The discharge conveyor drive sprocket 204 is keyed to a shaft 207 journaled on the adjustable frame, while the takeup sprocket 206 is journaled on one end of a bellcrank 209. The bellcrank 209 is journaled on the adjustable frame and has its other end pivotally connected to one end of a link 211. The other end of the link is slidably received in a boss 212 and is held is adjusted position by lock nuts 213 and a spring 214.

A drive train 216 for the filling section 54 (FIGS. 4, 5 and 6) is mounted on a downwardly projecting platform 217 of the movable frame 137. The drive train comprises a motor 4M which includes a magnetic brake for instant stopping when deenergized and has a fluid coupling 219 secured to its output shaft 221 to start the conveyor 68 smoothly upon energization of the motor 4M. The fluid coupling 219 may be a number 6D Dodge Flexidyne drive as disclosed in Manual X693E and as manufactured by Dodge Manufacturing Corporation, Mishaweka, Ind. A drive pulley 222 keyed to the output of the fluid coupling 219 is connected by V-belts 223 to drive pulleys 224 of a variable speed driving unit 226. The variable speed driving unit 226 includes a drive pulley 227, a driven pulley 228, a drive belt 229 and a hand wheel 231 for varying the pitch diameter of the pulleys 227 and 228. The variable drive unit 226 may be of the type manufactured by Reliance Electric and Engineering Co., Reeves Pulley Division, Columbus, Indiana. The pulley 228 is connected to the input shaft 232 of a gearbox 233 which has a drive sprocket 234 keyed on its vertically extending output shaft 235. A drive chain 236 is trained around the sprocket 234, around a sprocket 237 rigidly connected to and of the same diameter as the sprocket 194, and around a takeup sprocket 238. The takeup sprocket is journaled on a shaft 239 which is supported by the movable frame 137 and is held in adjusted position by a line 241 connected to an apertured boss 242 of the frame 137. During normal operation, the drive train continuously drives the transport conveyor 68 and the several turrets of the filling section which are driven thereby.

As indicated in FIG. 7, the carton transport conveyor 68 is of double-chain construction and has a plurality of carton carriers 246 secured thereto. Each carrier 246 includes a floor plate 247 having three upstanding walls 248, 249 and 251 formed integrally therewith. A strap 252 is welded to the walls to strengthen the same.

Figure 3:
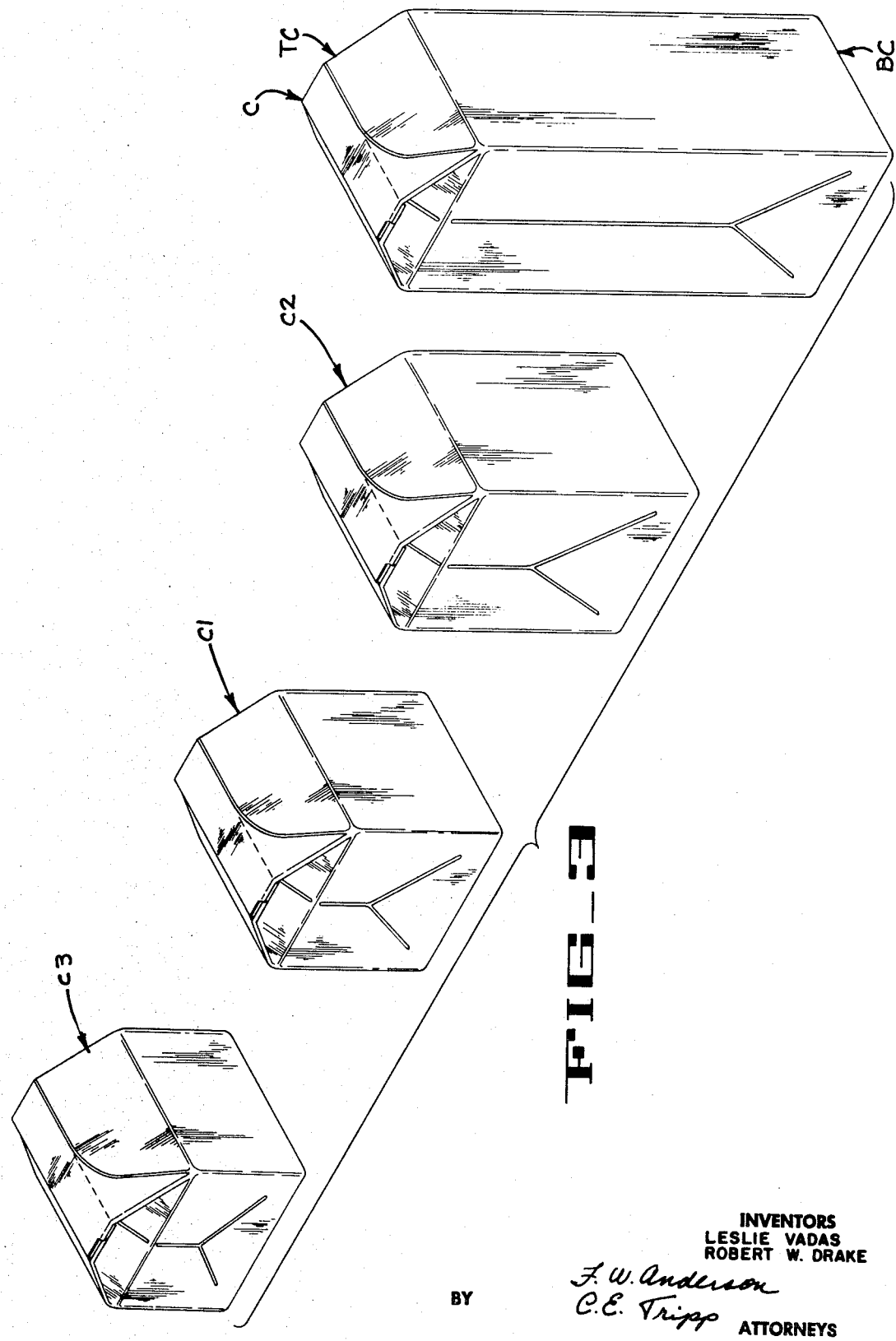
FIG. 3 is a perspective showing the four sizes of cartons which are handled by the machine of FIG. 1, the top closures of the cartons being sealed.

It will be apparent that the only adjustment necessary to adapt the wet or filling section 54 to handle the four different carton sizes illustrated in FIG. 3 is to move the movable frame 137 and the transport conveyor 68 as a unit to an appropriate height wherein the floor 247 of each carrier 246 will support the top closure of the associated carton at the proper elevation. Thus, the top closures of all sizes of cartons are maintained at the same elevation when being operated upon by the several components of the filling section 54.

NO-CARTON NO-FILL TURRET

After the top closure flaps of the cartons have been preformed by the top forming turret 100 (FIG. 4) at Station S16, the transport conveyor 68 advances the cartons supported in the carriers 246 around the takeup sprocket 206 and into the no-carton, no-fill turret 102 at Station S17. The no-carton, no-fill turret 102 detects the presence or absence of a carton in each carrier 246. If a carton is absent from a carrier 246 a cam follower 291 (FIGS. 8 and 9) is held in an active position in the path of movement in an actuating wheel 292 of the particular one of the plurality of filling valves 105 of the filling turret 104 at Station S18 associated with the empty carrier. If a carrier 246 moving past the no-carton, no-fill turret 104 has a carton therein, the cam follower 291 will be held away from the path of movement of the actuating wheel 292 of the filling valve associated with that carrier.

The no-carton, no-fill turret 102 (FIG. 9) includes the aforementioned stationary column 173 which is bolted to the stationary frame 132 and is formed by an upper tube supporting portion 294 which is press fitted into a lower mounting portion 296. The tubular turret drive column 182 is journaled on bearings 297 and 298 that are secured by lock nuts 299 to a vertically movable tubular column 301 which is bolted to the adjustable frame 137. A lower splash apron 302 is bolted to the sprocket 191 and the sprocket 191 is bolted to the rotary tubular turret drive 182. An upper splash apron 303 is bolted to the upper end of the tubular column 301 thereby preventing the bearings 297 and 298 from becoming contaminated. A carton backup ring 304 is locked to the hub of the sprocket 191 and has resilient O-rings 306 fitted in annular grooves in the periphery thereof and disposed in position to close the open sides of the carrier 246 and maintain the cartons therein when the cartons are moving around the turret 102.

As shown in FIGS. 9 and 10, a rotary cam 307 is formed on the lower end of the rotary column 182 and has three equally spaced lobes 308 thereon which project outwardly therefrom and are positioned to engage a cam follower 309. The cam follower 309 is journaled on one end of a bellcrank 311 which is pivoted on a capscrew 312 that is screwed into a bracket 313 secured to the nonrotatable vertically movable column 301 by capscrews 314. The other end of the bellcrank 311 has a vet vertically extending box 316 pivotally connected thereto by a capscrew 317 and has a spring guide rod 318 rigidly secured thereto. The other end of rod 318 is slidably received in a boss 319 which is pivotally mounted on the bracket 313 by a capscrew 31 321. A helical compression spring 322 is disposed around the rod 318 and is fitted between the bosses 316 and 319 thereby urging the cam follower 309 toward the cam 307.

A vertically extending pivot shaft 324 has a carton-sensing finger 325 (FIGS. 8 and 9) secured to its upper end which finger normally projects into the path of movement of cartons C carried in the carrier 246 therepast. If a carton is absent from the carrier 246, a locking lever 326 that is clamped on the lower end of the shaft 324 will be maintained in the inactive position shown in FIG. 10 by a light tension spring 327 connected between the lever 326 and the bracket 313. An abutment pin 328 engages the lever 326 to limit the amount of clockwise movement permitted the lever. If a carton is present in the carrier, the fingers 325 will engage the carton shortly after the cam follower 309 engages one of the lobes 308.

Engagement of the cam follower 309 with a lobe 308 causes the bellcrank 311 to pivot in a counterclockwise direction (FIG. 10) thereby allowing the free end of the locking lever 326, upon engagement of the sensing finger 325 with the carton, to be pivoted and held opposite a locking surface 331 of the bellcrank. After the cam follower 309 has moved off the lobe 308, the locking surface 331 of the bellcrank moves into abutting engagement with the free end of the locking lever 326 thereby holding the bellcrank 311 in an inactive position with the cam follower 309 spaced from the cam 307 until after the carton has moved out of engagement with the sensing finger 325 and the next adjacent cam lobe 308 has engaged the cam follower 309 thereby releasing the locking lever 326 for return to the active position shown in FIG. 10. In this way, the no-carton, no-fill turret is prepared for the next carrier, empty or filled, moving therepast.

The aforementioned cam follower 291 (FIGS. 8 and 9) is moved between an inactive position out of the path of movement of the wheels 292 when a carton is present in the associated carrier 246, to an active position in the path of movement of the actuating wheels 292 when an empty carrier passes the sensing finger 325. In order to control the position of the cam follower 291, one end of a connecting link 332 (FIG. 10) is pivotally connected to the bellcrank 311 and has its other end pivotally connected to a lever 333 secured to the upper end of a pivot shaft 334 which is journaled in the bracket 313 and in a hub 336 (FIGS. 9 and 11) formed on one end of a lower bracket 337 that is bolted to a stationary frame 132 by bolts 338. The shaft 334 is of two-piece extensible construction and includes an upper section having a semicylindrical portion 339 which registers with the semicylindrical portion 341 of a lower section. A drive ring 342 is welded to the lower semicylindrical portion 341 and slidably receives the upper semicylindrical portion 339 thereby permitting vertical adjustment of the frame 137 relative to the stationary frame 132 so as to handle all for sizes of cartons upon selective adjustment of the vertically moving frame 137.

An actuating lever 343 (FIG. 11) is secured to a lower portion of the shaft 334 and is pivotally connected by a link 344 to a lever 345 which is secured to an elongated shaft 346 that extends through and is journaled in both the lower bracket 337 and the tubular columns of the no-carton, no-fill turret 102, and projects outwardly from the upper end of the columns. A lever 347 is clamped to the upper end of the shaft 346 and has the cam follower 291 journaled on the free end thereof.

As indicated in FIG. 4, the transport conveyor 68 includes portions between the top forming turret 100 and the no-carton, no-fill turret 102, and between the no-carton, no-fill turret 102 and the top-heating turret 106 which are moving closely adjacent each other in opposite directions. In order to positively prevent engagement of a tilted carton with one moving in the opposite direction relative thereto in these areas, a somewhat V-shaped carton guide 348 (FIGS. 8 and 9) is mounted on a bracket 349 secured to the upper tube 294 of the stationary column 173. The carton guide 348 is disposed at an elevation which will engage the top close closure of any carton which is improperly positioned in the associated carrier. It will be understood that improperly positioned cartons moving around the no-carton, no-fill turret 102 will contact certain inside surfaces of the guide 348, while improperly positioned cartons moving out of the top forming turret 100 or into the top heating turret 106 will contact certain outside portions of the guide 348.

FILLING TURRET

After the continuously moving transport conveyor 68 (FIGS. 8, 12A and 12B) has moved the carrier 246 and carton supported through the no-carton, no-fill turret 102 at Station S17, the carriers 246 advance the cartons into and through the filling turret 104 at Station S18. While moving through the filling Station S18, each carton is filled by one of the eight identical filling heads 105. If a carton C is not present in one of the carriers 246 passing through the filling station S18, the sensing of such condition by the no-carton, no-fill turret 102 at Station S17 will cause the cam follower 291 of the no-carton, no-fill turret 102 to pivot the wheel 292 through 90° thereby deactivating the particular filling head 105 associated with the empty carrier preventing discharge therefrom.

As with the other turrets of the filling section 54, the transport conveyor 68 is vertically adjustable to accommodate the four sizes of cartons illustrated in FIG. 3. In addition to the conveyor height adjustment, the filling turret 104 features an in-motion adjustment mechanism 356 (FIGS. 12A and 12B) may be adjusted while the machine is in motion to increase or decrease the amount of liquid entering the cartons so as to accurately comply with minimum carton weight requirements.

Another feature of the filling turret 104 is that a clean-in-place mechanism 357 (FIG. 12B) is provided which permits cleaning liquids and flushing liquids to be run through the filling heads 105 in normal filling cycles so as to clean all internal milk passages of the filling turret 104 without requiring that the filling heads 105 be disassembled. When the clean-in-place operation is being performed, the filling turret 104 is disconnected from the drive for the other components of the fillings section 54 and is operated through its normal filling cycles from a separate drive source.

The filling turret 104 (FIGS. 12A and 12B) includes the aforementioned stationary column 174 which is bolted to the stationary frame 132. The tubular turret drive housing 183 is journaled on the column 174 by bearings 358 and 359 and is held from vertical movement relative to the column 174 by locknuts 361 screwed on the column 174. A drive hub 362 is slidably mounted on the drive housing 183 for vertical movement relative thereto. The drive sprocket 192 is rotatably received, but normally locked in driving engagement, in an annular groove 363 formed in the drive hub 362 and has its lower edge closed by a splash apron 364 bolted to the hub 362. The hub 362 is supported on the adjustable frame 137 for movement therewith by an annular support 366 which is bolted to the adjustable frame 137 and has the tubular rotary column 183 and stationary column 174 projecting upwardly therethrough. A pair of mating thrust bearings 367 and 368 are connected to a flange 369 on the lower end of the drive hub 362 and to the annular support 366, respectively, thereby permitting rotation of the drive hub 362 relative to the annular support 366. An S-shaped bracket 372 bolted to the support 366 and projecting over a flange 369 prevents undue separation from occurring between the thrust bearings 367 and 368.

A guide shaft support 374 is bolted to the rotary column 183 and includes eight evenly spaced arms 376 which project radially outward therefrom. The guide shaft support 374 also includes a pair of collars 377 (only one being shown in FIG. 12B), each of which slidably receives a drive and cam elevating post 378 secured to the drive hub 362. It will be noted that the drive posts 378 transmit rotary motion from the hub 362 yet permits vertical movement of the hub 362 relative to the support 374.

The lower ends of a plurality of pairs of vertically extending filling head guide shafts 379 and 381 are secured in bases 382 that are bolted to the free end of the arms 376 of the guide shaft support 374. It will be understood that eight bases 382 and pairs of guide shafts are provided, although only two bases and pairs of shafts are illustrated in FIG. 12A. The upper end of each pair of guide shafts 379 and 381 are secured to brackets 383 (FIG. 12A) which are bolted to a ring 384 formed adjacent the outer periphery of a liquid supply tank 385. The liquid supply tank 385 includes a conical floor 386 which has a bushing 387 bolted to its lower surface, which bushing is journaled on the reduced diameter upper end of the stationary column 174. Thus, it will be apparent that the pairs of guide shafts 379 and 381 and the tank 385 rotate about the axis of the stationary column 174 and is held from vertical movement relative thereto. Liquid, such as milk, is directed into the tank 385 through a conduit 385A which a float controlled valve and liquid level indicator FCV at its lower end to control the flow of liquid into the tank 385.

In order to prevent any tendency of the guide shafts 379 and 381 from shifting their vertical positions due to the driving forces acting thereon, a stabilizing wheel 388 is journaled on the stationary column 174 near the upper end thereof and has a plurality of radial arms 389 projecting outwardly therefrom with a collar 391 formed on the free end of each arm which slidably engages associated ones of the guide shafts 379. The wheel 388 includes a flange 392 on the lower end of its hub 393, which flange rides on the nylon thrust bushing 394 that is supported by the flanged upper end of a track supporting hub 396. The hub 396 is rigidly secured to the stationary column by a pin 397 and has a split block 398 at its lower end. A U-shaped retainer 399 is bolted to the hub 396 and includes an upper portion which extends over the flange 392 and prevents e separation of the flange from the thrust bushing 394.

A stationary upper cam 401, diagrammatically illustrated in FIG. 12A, is bolted to the hub 396 and includes an upper annular track 402 and a lower annular track 403. A lower annular cam 404 of multipiece adjustable construction is also diagrammatically illustrated in FIG. 12A and has a stationary portion 406 secured to the hub 396 and an adjustable portion 407 secured to the free end of a vertically movable cam arm 408 (FIG. 12B) that is held from rotation by a collar 409 integral therewith and slidably received on the stationary column 174. As will be described in more detail hereinafter, the adjustable cam arm 408 is supported by a nonrotatably hub 410 that is slidably mounted on the stationary column 174. The hub 410 has a flange 411 which rests on a thrust bearing 412 that is supported by a flange 413 of a rotatably hub 414 which is slidably mounted on the stationary column 174 and includes a pair of radially extending arms 416 and 417 bolted to the upper end of the diametrically opposed drive posts 378, only one post being shown. Thus, upward movement of the movable frame 137 and conveyor 68 will be transmitted to the drive posts 378, the hubs 410 and 414, and the adjustable cam track supporting arm 408 thereby moving the adjustable portion 407 of the cam 404 vertically.

Since each of the eight filling valves 105 (FIGS. 15 and 17) are identical, only one valve will be described in detail. Each filling valve comprises a stationary, open-ended tubular cylinder 421 having a flange 422 on its upper end bolted in fluid-tight engagement to the ring 384 of the tank 385. The stationary cylinder 421 is in constant communication with a supply of liquid in the tank 385 through an opening 423 in the ring 384. The upper flanged end 424 of movable cylinder 426 is slidably received in the stationary cylinder 421 and is maintained in fluid-tight engagement therewith by an O-ring 427 received in an annular groove in the flange 424. The movable cylinder 426 has a foot valve supporting flange 428 intermediate of its ends, and a filling tube 429 that is secured to and is concentric with the upper portion of the movable cylinder 426. An arm 431 is secured to and projects radially outward from the movable cylinder 426 and has a cam follower 432 journaled thereon which rides against the upper track 405 of the adjustable cam 404 thereby reciprocating the movable cylinder and the filling tube 429 vertically during its movement around the cam 404.

A foot valve 433 at the lower end of the filling tube 429 is secured to a U-shaped support strap 434 having a flange 436 rigidly secured to its upper end. The foot valve 433 is normally held in closed position by compression springs 437 disposed between the flange 436 and the heads of capscrews 438, which capscrews extend through holes in the flange 436 and are screwed into the foot valve supporting flange 428.

It will be noted that the foot valve 433 may be by light pressure applied to the liquid within U.S. tube 429, which pressure will overcome the resilience of the springs 437 to automatically open the foot valve and discharge liquid from the tube. Conversely, if the pressure within the filling tube 429 is relatively low, the springs 437 will automatically close the foot valve preventing discharge of liquid therefrom. A pressure operated filling valve of the type mentioned above, and which may be substituted in the filling turret 104 for the piston-type filler valve disclosed herein, is disclosed in U.S. Pat. No. 3,295,722 to Gordon et al. which issued on Jan. 3, 1967.

Although the foot valve 433 may be pressure operated as above described, in the preferred embodiment illustrated in FIGS. 14 and 15, the valve is actuated by the cam track 405a of the adjustable cam 404 which varies in elevation relative to the upper track 405 along a certain arcuate range thereof, to be described hereafter, so as to open the foot valve 433. A cam follower 439 rides along the track 405a and is journaled on one end of a yoke 441 (FIGS. 14 and 15) which is pivotally connected by a pin 442 to spaced ears 443 projecting downwardly from the foot valve supporting flange 428. The forked end of the yoke 441 is pivoted on pins 444 which are secured to and project outwardly from the flange 436. In order to prevent rotation of the movable cylinder 426 relative to the stationary cylinder 421, a key 446 (FIG. 14) is bolted to the inner surface of the stationary cylinder 421 and rides along a keyway 447 formed in the outer surface of the movable cylinder 426.

As best shown in FIG. 14, a tubular piston 451 is disposed within the upper end of the movable cylinder 426 and includes a lower flange 452 which is sealed by an O-ring 453 in its periphery to the internal surface of the movable cylinder. The upper end of the tubular piston 451 projects upwardly into the liquid in the tank 385 and is provided with ports 454 to permit the liquid to enter and flow through the tubular piston.

An inlet valve 456 is movable between positions which will open or close the lower end of the tubular piston 451. The inlet valve 456 is mounted on a shaft 457 which extends upwardly through the tubular piston 451 and has a slotted, cylindrical connecter 458 on its upper end which receives one end of an inlet valve actuating lever 459. A similar piston actuating lever 461 has a forked and slotted end 462 which engages a pin 463 extending through the upper end of the piston 451.

The levers 459 and 461 project through an opening 464 in the sidewall 466 of the tank 385 and are pivoted on pins 467 and 468, respectively, which are secured to the wall 466 of the tank. A flexible diaphragm 469 is bonded to the pins and to the levers 459 and 461 and is secured to the opening 464 by a collar 471 and capscrews thereby sealing the opening. The outer ends of the levers 459 and 461 are pivotally connected to the upper ends of pushrods 473 and 474, respectively, by links 476 and 477, respectively.

In order to actuate the inlet valve 456, the lower end of the pushrod 473 is rigidly secured to a horizontal arm 478 of an upper carrier 479 (FIGS. 13, 17 and 18) which is slidably mounted on the associated guide shafts 379 and 381. A cam follower 481 is journaled on the upper carrier 479 and rides along the upper track 402 of the stationary cam 401. The lower end of the pushrod 474 is rid rigidly secured to a lower carrier 482 which is slidably mounted on the guide shafts 379 and 381 and has a cam follower 483 (FIGS. 16 and 18) journaled thereon which rides along a lower track 403 of the stationary cam 401. The lower carrier 482 includes a horizontal, generally L-shaped arm 484 which has a no-carton, no-fill shaft 485 journaled therein. The aforementioned no-carton, no-fill actuating wheel 292 is rigidly secured to the outer end of the shaft 485 and includes a no-carton finger 486 which normally projects upwardly (FIGS. 13 and 18) and a return finger 487 which is normally horizontal and projects rearwardly. A collar 488 is rigidly secured on the other end of the shaft 485 and has an inlet valve opening rod 489 welded to and projecting outwardly from the periphery thereof in a direction opposite to that of the return finger 487. A cylinder locking finger 491 (FIG. 18) is welded to the free end of the collar 488 and projects outwardly therefrom in a direction opposite to that of the no-carton finger 486.

If the no-carton, no-fill turret 102 (FIG. 8) at Station S17 detects a carton in the carrier 246 associated with the filling valve 105, the cam follower 291 will not be disposed in position to engage the finger 486 and accordingly, the shaft 485 will not be pivoted and the associated filling valve 105 will operate in the normal manner to fill the carton. However, if the no-carton, no-fill device 102 determines that a carton is not present in the carrier 246 associated with the filling valve 105, the cam follower 291 will be moved in position to engage the no-carton finger 486 of the wheel 292 thereby pivoting the wheel and shaft 485 through 90° in a counterclockwise direction as viewed in FIG. 13. Such pivotal movement will move the valve-opening rod 489 to a vertical position as indicated in phantom lines in FIG. 16 so that h the upper end of the rod 489 will move into abutting engagement under the horizontal arm 478 of the upper carrier 479 thereby preventing the downward motion of the upper carrier 479 and closing the inlet valve 456 while the empty carrier is disposed therebelow. Such pivotal movement of the shaft 485 will also swing the cylinder-locking fingers 491 from a downward position to a horizontal position into engagement with a shoe 493 welded on the upper end of a locking lever 494 that is pivoted about a capscrew a capscrew 496 secured to the stationary cylinder 421. The locking lever 494 includes a hook 497 on its lower end. Pivotal movement of the finger 491 against the shoe 493 moves the lever 494 from the solid line position (FIG. 16) to the phantom line position thereby moving the hook 497 into locking engagement with a pin 498 welded to the movable cylinder 426 holding the movable cylinder in its uppermost position with the foot valve 433 closed until the associated empty carton carrier 246 (FIG. 12B) has been moved out of the filling turret 104.

The wheel 292 and shaft 485 are returned to the inactive position shown in FIG. 13 by engagement of the return finger 487 a with a cam follower 499 (FIG. 12A) which is journaled on a racket 501 secured to a utility post 502. The shaft 485 is held in adjusted position by a friction washer 503 or the like disposed between the wheel 292 and the L-shpaed arms 484. Although the finger 491 will slide vertically along the surface of the shoe 493 when a carton is absent from the carrier below the valve 105, it will be understood that the friction washer 503 will prevent the shaft 485 from pivoting until the return finger 487 engages the cam follower 499.

As mentioned previously, the filling turret 104 (FIGS. 12A and 12B) selectively accommodates the four carton sizes upon vertical movement of the adjustable frame 137 and parts, including the movable cylinder 426, supported thereon to the proper elevation for the particular size of cartons being filled. In addition to the normal vertical movement of the parts supported by the movable frame 137 when adjusting the machine to handle different sizes of cartons, the previously mentioned in-motion adjustment mechanism 356 is provided to permit small vertical adjustments of the lowermost position of the movable cylinder 426 thereby accurately controlling the volume of liquid entering the carton being filled.

In order to provide such vertical adjustment of the movable cylinder 426, the aforementioned cam 404 (FIGS. 19, 20 and 21) includes the stationary portion 406 and the adjustable portion 407. The stationary portion 406 which is bolted to the track-supporting hub 396 (FIG. 19) and has collars 506 and 508 formed on opposite ends thereof. The collar 506 registers with a collar 509 formed integrally on the upper end of an arcuate cam segment 511, which collar is pivotally mounted on a bolt 512. Similarly a collar 513 on the upper end of an arcuate segment 514 is pivotally mounted on a bolt 517 which is received in the collar 508. A lower arcuate segment 518 of the adjustable cam portion 407 is bolted to the arm 408 and has collars 519 and 521 formed on its ends. A collar 522 on the lower end of a segment 523 is journaled on capscrews 524 secured in the collar 519, while a collar 526 on a segment 527 is journaled on a capscrew 528 that is received in the collar 521. The segment 523 has a U-shaped groove 529 formed therein which registers with a tongue 531 on the segment 511 to define a downwardly sloping portion of the cam 404. Similarly, a U-shaped groove 532 (FIGS. 19 and 20) formed in the segment 527 slidably receives a tongue 533 of the segment 514. Thus, it will be apparent that vertical movement of the adjustable frame 137, and hence of the arm 408, will cause the lower segment 518 to move vertically and will cause the pairs of segments 511, 523, and 514, 527 to pivot about the associated bolts and to telescope relative to each other thereby defining the aforementioned annular upper track 405 and annular lower track 405a. Tongue and groove connections 534 and curved end portion 535 (FIG. 20) are provided in the lower track 405a to permit vertical adjustment of the movable section 407.

The in-motin adjustment mechanism 356 (FIGS. 12A, 12B, 19, 22 and 23) comprises an air motor 536 (FIG. 12B) which is secured to a bracket 537 that is bolted to the stationary column 174. A vertically extending drive shaft 539 is coupled to the air motor 536 and to the input shaft of a right-angle gearbox 541 (FIG. 19) that is secured to the track supporting hub 396. The output shaft of the gearbox 541 is coupled to a wormshaft 542 which projects through openings in the stationary column 174 and in the hub 396 and has its free end journaled in an apertured ear 543 bolted to the hub 396. A worm 544 is keyed on the output shaft 542 and meshes with a worm gear 546 that is connected to a splined shaft 547 for rotation therewith and for vertical movement relative thereto. The splined shaft 547 is journaled in ears 548 and 549 of the hub 396 a with the worm gear 546 being disposed between the ears 548 and 549.

As best shown in FIG. 22, the lower end of the splined shaft 547 is reduced in diameter and has a 551, and flanged bushings 552 and 553 secured thereto by a washer 554 and a capscrew 556. The bushings 552 and 553 are journaled in an ear 557 projecting outwardly from the hub 410, and the teeth 558 of the gear 551 mesh with mating teeth 559 formed in the arm 408. Thus, if it is determined that the cartons are being excessively overfilled or underfilled, the air motor 536 may be energized to drive the splined shaft 547 in the appropriate direction thereby causing the gear 551 to raise or lower, depending upon the direction of rotation of the shaft 547, the arm 408 and the adjustable portion 407 of the cam until the desired volume of liquid is filled into the cartons moving through the filling Station S18.

In order to employ the clean-in-place mechanism 357 to clean the internal passages of the filling turret 104, the product being packages is removed from the tank 385 and a cleaning solvent is pumped into the tank. The filling turret 104 is then disconnected from driving engagement with the transport conveyor 68 and the filling turret 104 is driven through the normal filling cycle until the passages are clean. The cleaning solvent is then removed from the tank and replaced with water, and the filling turret is again placed in operation and actuated through its normal filling cycle so as to flush all traces of the solvent from the filling turret 104 with the water.

As illustrated in FIGS. 24 and 25, the filling turret sprocket 192 is normally connected in driving engagement to the drive hub 362 by a latch finger 561 which is disposed between ears 562 and 563 of the drive hub 362 and is pivotally supported by a pivot bolt 564. The pivot bolts 564 is secured to collars 566 and 567 which are welded to studs 568 secured to the sprocket 192 by nuts 569. A pin 571 extends through aligned holes in the latching finger 561 and in the ears 562 and 563 and normally holds the latch finger 561 in driving position. The pin 571 is retained in the position shown in FIG. 25 by a ball detent 572 in the ear 563 and cooperating groove 573 in the pin 571. When it is desired to disconnect the sprocket 192 from the drive hub 362 in order to operate the clean-in-place mechanism 357, the pin 571 is merely withdrawn from the holes in the finger 561 and ear 562, the latch finger 561 is pivoted downwardly about the pivot bolt 564, and the pin 571 is resin reinserted into the holes in the ears 562 and 563.

After the sprocket 192 has been disconnected from the drive hub 362, (FIG. 12B) the filling valves 105 must first be locked in an elevated position and thereafter the drive hub 362 and conveyor 68 must be moved to its lowermost position so as to provide clearance between the lower end of the filling valves 105 and the carton carriers 246. Accordingly, the movable frame 137 is first elevated thereby lifting the hub 410 upwardly from the position shown in FIG. 22 to the position shown in FIG. 23. The operator then grips the handle 574 of a locking device 576 and pulls it outwardly releasing a C-shaped clamp 577 from locking engagement with the flange 411 of the hub 410 and the flange 413 of the rotatable hub 414 thereby permitting the flanges 411 and 413 to be separated as indicated in FIG. 23.

The locking device 576 includes a shouldered locking shaft 578 which is secured to the handle 574 by a nut 579 and has a large diameter latching head 581 on its free end. The shaft 578 is slidably received in an apertured boss 582 formed on the hub 410 and in a bushing 583 secured in the boss, and is urged toward the stationary column 174 by a spring 584. After the C-shaped clamp 577 has released the flanges, the locking device 576 is twisted 90° about the axis of the shaft 578 permitting the spring to move the head 581 into a vertical slot 586 formed in the stationary column 174. Thus, when the movable frame 137 if moved to its lowermost position, the head 581 will engage the lower end of the vertical slot 586 preventing the filling valves from moving downwardly and providing the requisite spacing between the carriers 246 and the lower ends of the filling valves 105.

With the filling valves 105 in their uppermost position and with the conveyor 68 lowered to its lowermost position and disconnected from driving engagement with the filling turret 104, an auxiliary clean-in-place drive 591 (FIGS. 12B and 26 to 28) is placed in operation. The clean-in-place drive 591 comprises a gear motor 7M which is mounted on a bracket 593 that is bolted to the stationary frame 132. A double-grooved drive pulley 594 is keyed to the output shaft 596 of the gear motor 7M and drives the belts 597 which are trained around the drive pulley 594 and around a double-grooved driven pulley 598. The driven pulley is keyed to the lower end of a stub shaft 599 (FIG. 28) which is journaled in a bracket 601 secured to the frame 132 and has a clutch drive jaw 602 of a clutch 603 keyed to its upper end. A driven clutch jaw 604 having an annular groove 604a near its upper end is mounted on the lower end of a vertical shaft 605 for rotation therewith but for axial movement relative thereto. The shaft 605 is journaled in a collar 606 of the bracket 601 and in an apertured bushing 607 (FIG. 12B) formed on a bracket 608 bolted to the stationary tubular column 174. A spur gear 609 is keyed to the upper end of the shaft 605 and meshes with a ring gear 612 that is rigidly secured to the tubular turret drive column 183. Thus, when the gear motor 7M is energized and the clutch 603 is engaged, the filling turret 104 will be driven through its normal cycle of operation.

In order to engage or disengage the clutch 603 and to deactivate the no-carton, no-fill turret 102 (FIG. 8) at Station S17, an elongated horizontally disposed clutch-actuating rod 614 (FIG. 27) is slidably received in collars 616 that are secured to the bracket 601 which is bolted to the stationary frame 132. The clutch-actuating rod 614 has an operator's knob 619 secured to one end and a no-carton, no-fill deactivating finger 621 secured to the other end thereof. The rod is held from rotation by pins 620 which are secured in the collars 616 and are received in a keyway in the rod 614. When the rod 614 is in the clutch-actuating position illustrated in FIG. 26, the finger 621 engages the foot 5 622 formed on the previously described lever 345 (FIGS. 11 and 26) of the no-carton, no-fill turret 102 and prevents movement of the cam follower 291 (FIG. 8) into position to engage the finger 486 of the actuating wheel 292 thereby permitting the filling valve heads 105 to operate through their normal cycle even through not cartons are present in the carriers 246.

A spring 623 is disposed between one of the collars 616, which slidably supports the rod 614, and a collar 624 that is pinned to the rod thereby urging finger 621 away from the foot 622. The clutch-actuating rod 614 is locked either in the active position shown in FIG. 26, wherein the clutch 603 is engaged, or in an inactive position by inserting a locking lug 626 into slots 627 and 628, respectively, in the rod 614. The spring 623 urges the lug 626 against the face of a bracket 629 which is bolted to the stationary frame 132.

The clutch 603 is actuated upon reciprocation of the rod 614 by a clutch cam 631 which is rigidly secured to the rod 614. The upper end of the body of the cam 631 is slotted to receive the lower end of a pushrod 632 which has a pin 633 extending transversely therethrough and slidably engaging sloping camming surfaces 634 of grooves formed in spaced upstanding walls of the cam 631. The pushrod 632 is journaled in a bushing 637 secured to the bracket 601 and has an apertured boss 638 formed on its upper end. A spring 639 disposed between the bracket 601 and boss 638 normally urges the push rod 632 upwardly. A yoke 641 has one end pivotally connected to the boss and and is pivoted about a shaft 642 supported by the bracket 601. A pair of cam followers 644 journaled on the other end of the yoke 641 are slidably received in the groove 604a of the driven clutch jaw 604 thereby permitting rotation of the clutch jaw 604 relative to the yoke 641 and permitting the yoke to move the jaw 604 vertically between the engaged and disengaged position in response to reciprocation of the rod 614.

Thus, when the rod 614 is moved to the position shown in solid lines FIG. 26 and is locked therein by the lug 626, the finger 621 engages the foot 345 deactivating the no-carton, no-fill turret 102 and the cam-actuated yoke 641 engages the clutch 603 thereby driving the filling turret 104 through the auxiliary clean-in-place drive 591 causing the filling heads 105 to operate in the normal manner. It will, or course, be realized that during the clean-in-place operation, cartons will not be present around the filling turret and that the cleaning solvent or flush water may be collected after flowing through the valves in troughs (not shown) and may be returned to the tank for recycling.

In order to better understand the operation of each filling head 105, reference may be had to FIGS. 29 through 37 which illustrate progressive positions of the different components of the filling head as controlled by the cam tracks 402, 403, 405 and 405a illustrated in the a cam diagram shown in FIG. 38. When the filling head 105 is at its starting position which is indicated as the 0° position in FIGS. 8 and 38, the parts of the filling head are positioned as indicated in FIG. 29. At this time, the inlet valve 456 is open, the piston 451 and movable cylinder 426 are in their uppermost positions, and the foot valve 433 closes the lower end of the filling tube 429. During the next 70° of rotation of the filling turret, the movable cylinder 426 moves downwardly to its lowermost position as indicated in FIG. 30 with the foot valve 433 closed and spaced above the carton bottom closure approximately seven-sixteenths of an inch. During this motion the piston 451 remains in its uppermost position and the inlet valve 456 is open thereby permitting a column of liquid to flow from the tank 385 into the movable cylinder 426 and its associated filling tube thereby completely filling the same. The inlet valve 456 is then closed as indicated in FIG. 31 by the cam track 402, and shortly thereafter the foot vale 433 is opened by the cam track 405a as indicated in FIG. 32.

With the inlet valve 456 closed and the foot valve 433 opened, the piston 451 and closed inlet valve are slowly moved downwardly as a unit thereby slowly forcing liquid into the carton C covering the lower end of the filling tube 429 and foot valve 433 with liquid thus preventing foaming. As indicated in the cam diagram of FIG. 38, this preliminary filling occurs between approximately 85° and 175° range of rotation of the filling turret 104. It will also be understood that although the cam track 405a is provided for opening the foot valve 433 in the preferred embodiment of the filling valve, the cam 405a could be omitted and the foot valve would be opened by pressure exerted thereagainst by liquid resulting from the downward movement of the piston and, subsequently the upward movement of the movable cylinder 426.

After the preliminary filling step has been completed upon rotation of the filling turret 104 through the first 175° of its cycle of operation thereby covering the lower end of the filling tube 429 with liquid, the movable cylinder 426 and the open foot valve 433 (FIG. 34) are more rapidly moved upwardly as a unit by the cam tracks 405 and 405a. This main filling operation occurs during the 175° to 215° range of travel of the filling turret 105, and upon completion of the main filling cycle the foot valve 433 is closed as indicated in FIG. 35 with the lower end of the filling tube 429 covered by approximately three-eighths of an inch of liquid. The inlet valve 456 is then opened as indicated in FIG. 36 while the movable cylinder 426 and foot valve 433 move through a 10° safety period at which time they remain at a constant elevation. With the inlet valve 456 open and with the foot valve 433 closed, the foot valve and filling tube 429 are moved upwardly out of the carton to the starting position, and simultaneously therewith, the inlet valve 456 and piston 451 move to their starting positions as indicated in FIG. 37, thereby completing one cycle of operations of one of the filling heads 105.

The filled carton is then discharged from the filling turret 104 (FIG. 1) at Station S18 and is conveyed into the top-heating turret 106, at Station S19 by the continuously driven carton transport conveyor 68 for further processing.

From the foregoing description it will be apparent that the carton-filling apparatus of the present invention is adjustable to handle several different sizes of cartons, and in addition to adjustment for carton size, the apparatus includes an in-motion adjustment device which is independent of the carton size adjustment means and serves to slightly change the position of the filling tubes so as to correct for slight overfilling and underfilling of the carton. The apparatus includes a clean-in-place device which is effective to clean the filling apparatus without requiring that the filling heads be disassembled. The apparatus also includes a no-carton, no-fill device which assures that liquid will be discharged from the filling heads only if a carton is in position to receive the liquid.

Although the best mode contemplated for carrying out the present invention has been herein shown and described, it will be apparent that modification and variations may be made without departing from what is regarded to be the subject matter of the invention as set forth in the appended claims.

I claim:

1. In a carton-forming and filling machine, a filling turret for filling cartons each having a sealed bottom closure and an open top closure, comprising a stationary frame, a stationary column secured to said frame and having a vertical axis, a rotary column journaled on said frame and held from vertical movement relative thereto, a tool support secured to said rotary column, a supply tank having a flowable material therein secured to said tool support and journaled for rotation about the upper end of said stationary column, a plurality of evenly spaced filling valves supported by said tool support, a vertically movable frame, a drive hub supported by said frame for vertical movement therewith and for rotation relative thereto, said drive hub being slidably received on said rotary column for vertical movement relative thereto, a turret drive sprocket journaled on said hub, latch means normally locking said drive sprocket to said hub, means connecting said hub to said tool support for rotation therewith and for vertical sliding movement relative thereto, an endless conveyor trained around said drive sprocket, a plurality of carton carriers secured to said conveyor and having cartons therein in alignment with associated ones of said filling valves for receiving flowable material from said valves, first drive means for continuously driving said conveyor, means including a filling valve-actuating means for releasing flowable material from said filling valves into the cartons when aligned with the cartons to fill the cartons, adjustment means for varying the distance of said carton carriers and said flow releasing means from said tool support for accommodating and filling cartons of different sizes with different volumes of flowable materials, and a no-carton, no-fill device associated with said conveyor for detecting the absence of a carton in a carrier and to deactivate the filling valve associated with the carrier upon such detection.

2. A filling turret according to claim 1 wherein said filling valve-actuating means includes an annular cam having a stationary portion and a vertically movable portion.

3. An apparatus according to claim 2 including a clean-in-place device comprising, means for locking the movable portion of said annular cam in an elevated position, means for disconnecting said drive sprocket from said drive hub, means for deactivating said no-carton, no-fill device, clean-in-place drive means independent of said first drive means for driving said filling valves through their normal cycles of operation with a cleaning solvent in said tank and thereafter with the flushing liquid in said tank.

4. In an apparatus according to claim 1 wherein said valve-actuating means includes an annular cam having a stationary portion and a vertically movable portion, means connecting said vertically movable portion of said cam to said movable frame for movement therewith, and an in-motion adjustment means for vertically adjusting said movable portion of said cam track independently of the movement of said movable frame so as to compensate for slight overfilling or underfilling of the cartons.

5. In a carton-forming and filling machine, a filling turret for filling cartons having a sealed bottom closure and an open top closure, comprising a stationary frame, a stationary column secured to said frame and having a vertical axis, a rotary column journaled on said frame and held from movement relative thereto, a tool support secured to said rotary column, a supply tank having a flowable therein secured to said tool support and journaled the lower rotation about the upper end of said stationary column, a plurality of evenly spaced filling heads supported by said tool support, a vertically movable frame, a drive hub supported by said frame for vertical movement therewith and for rotation relative thereto, said hub being slidably received on said rotary column for vertical movement relative thereto, a turret drive sprocket journaled on said hub, latch means normally locking said drive sprocket to said hub, means connecting said hub to said tool support for rotation therewith and for vertical sliding movement relative thereto, an endless conveyor trained around said drive sprocket, a plurality of carton carriers secured to said conveyor and having cartons therein alignment with associated ones of said filling valves for receiving flowable material from said valves, first drive means for continuously driving said conveyor, each filling head including a first open-ended tubular cylinder, means connecting one end of said first cylinder to said supply tank, a vertically movable tubular cylinder concentric with and having the upper end thereof sealed to said first cylinder, means for preventing rotation of said movable cylinder relative to said said stationary cylinder, a filling tube formed on the lower end of said movable cylinder, a pressure-responsive foot valve closing the lower end of said filling tube when the pressure within the tube is low and opening the foot valve when the pressure within the filling tube is high, means within said movable cylinder defining an inlet valve, a cam follower connected to said movable cylinder, an annular cam track having a stationary portion and a movable portion in position to receive said cam follower and to vertically reciprocate said movable cylinder, means connecting said stationary cam portion to said stationary column, means connecting said movable portion to said movable frame, said annular cam adapted to lower said filling tube into the container therebelow until said foot valve is disposed immediately above the bottom closure and to thereafter raise the filling tube out of the carton, second cam means secured to said stationary column, means for operatively connecting said inlet valve means to said second cam means for opening said inlet valve when said filling tube is moving downwardly a predetermined distance and thereafter to close said inlet valve and to move said closed valve downwardly for a short distance when said filling tube is at its lowermost position thereby increasing the pressure in said filling tube causing said foot valve to open and slowly discharge material into the carton to a level above said foot valve, means for holding said inlet valve closed while said filling tube is being moved upwardly thereby causing the flowable material to flow into the carton to fill the same, said second cam means opening said inlet valve to relieve the pressure in the filling tube and close said foot valve as said filling tube is being raised out of said carton, and adjustment means provided for vertically adjusting said movable frame and said movable portion of said annular cam to accommodate cartons of different sizes and to fill proportionate quantities of flowable material into each carton size.

6. A filling turret according to claim 5 and additionally comprising an in-motion adjustment means for vertically adjusting said vertical portion of said annular cam independently of the movement of said movable frame for compensating for slight overfilling or underfilling of the cartons.

7. A filling turret according to claim 5 wherein a no-carton, no-fill device is provided and is activated upon detection of the absence of a carton in one of said carriers, and wherein means responsive to the activation of said no-carton, no-fill device is provided to block said vertically movable cylinder of the associated filling valve in its uppermost position thereby deactivating said filling valve.

UNITED STATES PATENT OFFICE
CERTIFICATE OF CORRECTION

Patent No. 3,568,734      Dated March 9, 1971

Inventor(s) LESLIE VADAS et al

It is certified that error appears in the above-identified pate and that said Letters Patent are hereby corrected as shown below:

| | |
|---|---|
| Column 2, line 64 | after "pint" delete "c2". |
| Column 3, line 18 | delete "to". |
| Column 3, line 20 | delete "we" |
| Column 5, line 31 | change "172" (second occurrence) t --173--. |
| Column 5, line 52 | change "is" to --in--. |
| Column 6, line 68 | delete "vet". |
| Column 6, line 73 | delete "31". |
| Column 7, line 49 | change "for" to --four--. |
| Column 8, line 25 | before "may" add --which--. |
| Column 8, line 38 | delete "s" from "fillings". |
| Column 9, line 12 | change "a" to --has--. |
| Column 9, line 30 | delete "e". |
| Column 9, line 41 | change "nonrotatably" to --nonrota |
| Column 9, line 44 | change "rotatably" to --rotatable-- |
| Column 10, line 66 | after "is" delete "rid" |
| Column 10, line 6 | after "be"(second occurrence) inse --actuated--. |
| Column 11, line 22 | delete "h" after "that". |
| Column 11, line 32 | delete "a capscrew" (second occurre |
| Column 11, line 44 | after "487" delete "a". |
| Column 12, line 37 | after "396" delete "a". |
| Column 12, line 40 | after "a" insert --gear--. |
| Column 12, line 56 | change "packages" to --packaged--. |
| Column 12, line 69 | change "bolts" to --bolt--,(second rence). |
| Column 13, line 32 | change "if" to --is--. |
| Column 13, line 6 | delete --resin--. |
| Column 13, line 74 | delete --5--. |
| Column 14, line 4 | change "through not" to --though n |
| Column 14, line 8 | after "urging" add --the--. |
| Column 14, line 52 | delete "a" after "the". |
| Column 14, line 69 | change "vale" to --valve--. |
| Column 16, line 3 | after "releasing" insert --a--. |
| Column 16, line 38 | after"from" insert --vertical--. |
| Column 16, line 40 | after "flowable" insert --material- |
| Column 16, line 54 | after "therein" insert --in--. |
| Column 16, line 62 | delete one --said--. |

Signed and sealed this 22nd day of February 1972.

(SEAL)
Attest

EDWARD M. FLETCHER, JR.      ROBERT GOTTSCHALK